United States Patent
Sasaki et al.

(10) Patent No.: US 12,115,889 B2
(45) Date of Patent: Oct. 15, 2024

(54) ENTRY-AND-EXIT ASSISTANCE DEVICE FOR VEHICLE

(71) Applicant: MAZDA MOTOR CORPORATION, Hiroshima (JP)

(72) Inventors: Takeshi Sasaki, Hiroshima (JP); Hiroaki Takayasu, Hiroshima (JP); Daisuke Tokuda, Hiroshima (JP); Kunihiko Kurisu, Hiroshima (JP); Hiroaki Saito, Hiroshima (JP); Takanori Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 294 days.

(21) Appl. No.: 17/905,110

(22) PCT Filed: Jan. 22, 2021

(86) PCT No.: PCT/JP2021/002219
§ 371 (c)(1),
(2) Date: Aug. 26, 2022

(87) PCT Pub. No.: WO2021/199612
PCT Pub. Date: Oct. 7, 2021

(65) Prior Publication Data
US 2023/0129501 A1    Apr. 27, 2023

(30) Foreign Application Priority Data
Apr. 1, 2020  (JP) .................. 2020-065775

(51) Int. Cl.
*B60N 2/24*    (2006.01)
*B60N 2/02*    (2006.01)

(52) U.S. Cl.
CPC .............. *B60N 2/245* (2013.01); *B60N 2/02* (2013.01); *B60N 2002/0288* (2013.01)

(58) Field of Classification Search
CPC .. B60N 2/245; B60N 2/02; B60N 2002/0288; A61G 3/00; A61G 3/02; A61G 5/00
See application file for complete search history.

(56) References Cited

U.S. PATENT DOCUMENTS 6,039,402 A * 3/2000 Nemoto ................. B60N 2/245
296/65.05
6,129,403 A * 10/2000 Townsend .............. B60N 2/245
296/65.01

FOREIGN PATENT DOCUMENTS

FR    2934820 A3 *  2/2010  ............ B60N 2/245
JP    H07-31456 U    6/1995
(Continued)

OTHER PUBLICATIONS

International Search Report issued in PCT/JP2021/002219; mailed Apr. 6, 2021.

*Primary Examiner* — Daniel J Colilla
(74) *Attorney, Agent, or Firm* — Studebaker & Brackett PC

(57) ABSTRACT

A vehicle entry-and-exit assistance device easily moves a board between a housed position and a using position. Embodiments include a board at an outer side of a seat adjacent to a door opening, the board rotatable between a horizontal posture and an orthogonal posture; a board support portion rotatable between a seat side-position and a flipped-up position; and a linking mechanism. The board pivots around an axis orthogonal to the vehicle width direction, and the support portion pivots around an axis extending in the vehicle width direction. The linking mechanism rotates the board to a vehicle-width-direction inner side with respect to the support portion to take the orthogonal posture when the support portion is rotated to the flipped-up position, and rotates the board to a vehicle-width-direction outer side with respect to the support portion to take the (Continued)

horizontal posture when the support portion is rotated to the seat side-position.

8 Claims, 18 Drawing Sheets

(56) References Cited

FOREIGN PATENT DOCUMENTS

| JP | 2003127731 A | * | 5/2003 |
| JP | 3928192 B2 | * | 6/2007 |
| JP | 2016097169 A | * | 5/2016 |

* cited by examiner

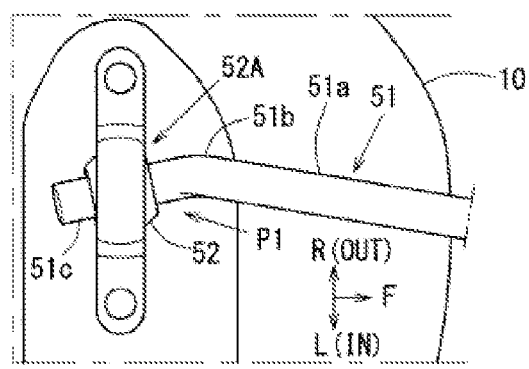
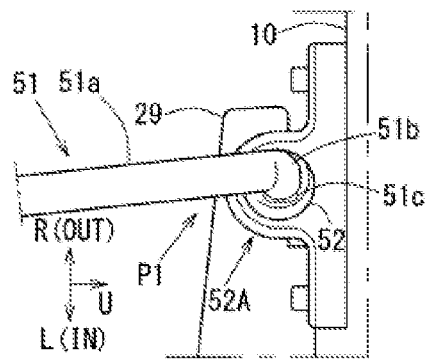
FIG. 14A1  FIG. 14A2
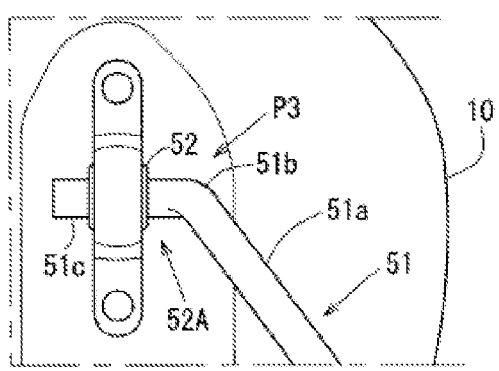
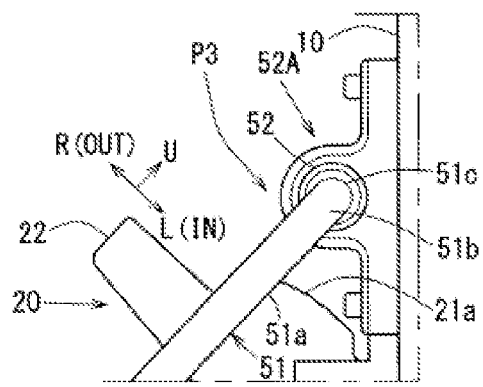
FIG. 14B1  FIG. 14B2
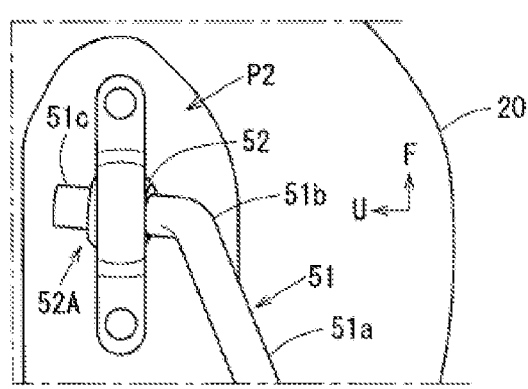
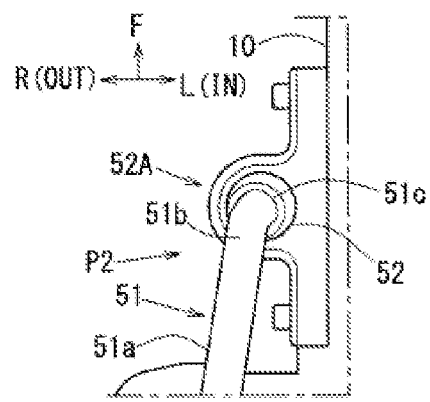
FIG. 14C1  FIG. 14C2

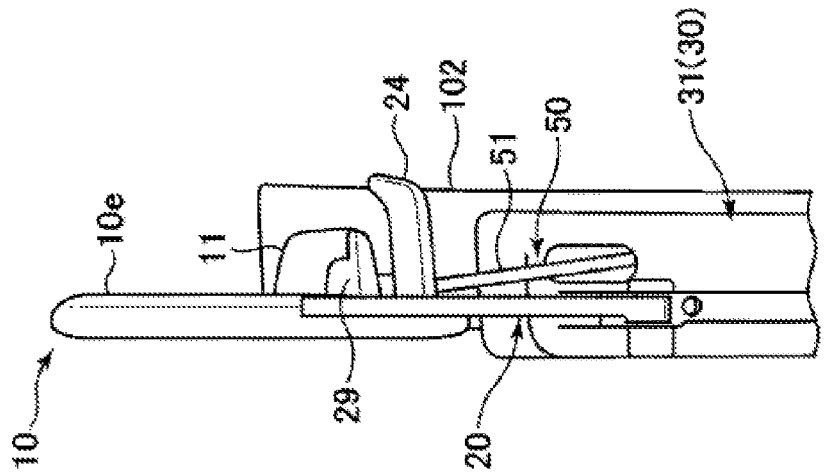
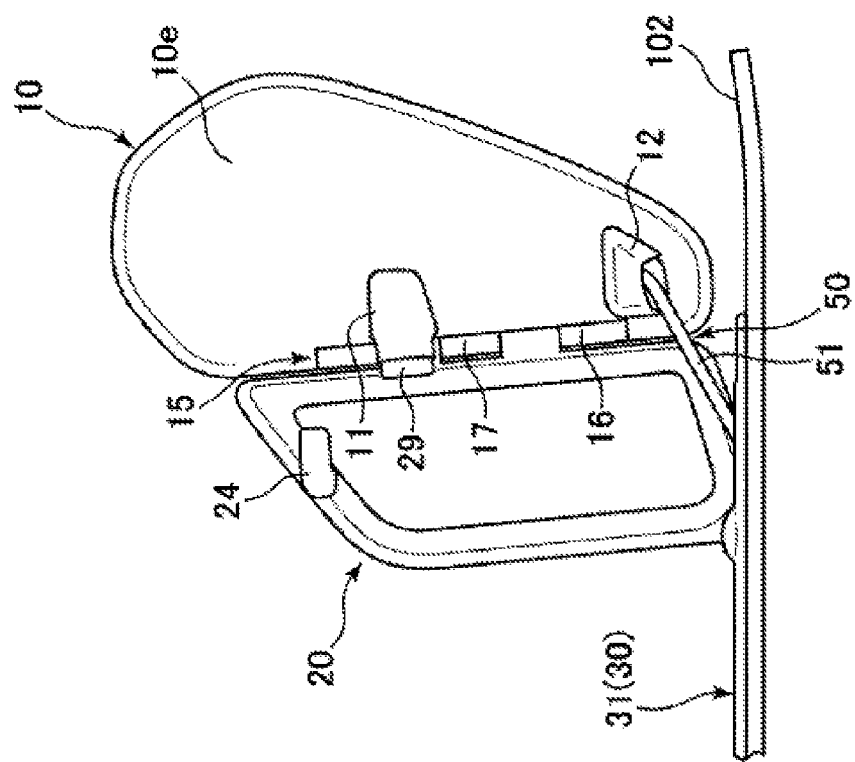

ENTRY-AND-EXIT ASSISTANCE DEVICE FOR VEHICLE

TECHNICAL FIELD

The present disclosure relates to an entry-and-exit assistance device for a vehicle, particularly to an entry-and-exit assistance device for a vehicle that includes a board on a vehicle-width-direction outer side of a seat adjacent to a door opening of a vehicle, the board being capable of being moved between a horizontal posture (using state) in which the board becomes generally horizontal and an orthogonal posture (housed state) in which the board is generally orthogonal to a vehicle width direction in a vehicle cabin.

BACKGROUND

In related art, a vehicle has been known that, in order to enable a person with disabled lower limbs to drive a vehicle, includes a board used as a temporary placement stand on which buttocks or the like of an occupant are temporarily placed in a position between a wheelchair and a vehicle seat, that is, a position on a door opening side of the vehicle seat when the occupant (person with disabled lower limbs) enters or exits the vehicle and moves between the wheelchair and the vehicle seat.

Further, it has been known that in such a vehicle, the board is provided to be capable of being displaced between a using position in which the board is usable as the temporary placement stand and a housed position in which the board is housed when that is not used (for example, see Japanese Utility Model Registration No.

A vehicle of Japanese Utility Model Registration No. 2599989 has an arm that is rotatable in a front-rear direction between a using position positioned in a side portion of a seat cushion on a door opening side of a vehicle seat and a housed position positioned in a side portion of a seat back and a board that is capable of being displaced with respect to the arm.

The vehicle of Japanese Utility Model Registration No. 2599989 is set to a state where the board that is generally horizontally arranged is supported by the arm from below in the using position, that is, a state where an occupant is capable of temporarily placing his/her buttocks and is meanwhile set to a state where the arm and the board are generally vertically housed in the housed position.

However, because the vehicle of Japanese Utility Model Registration No. 2599989 requests two actions of rotation of the arm in a front-rear direction and of displacement of the board with respect to the arm when the arm and the board are moved between the using position and the housed position, an improvement in usability is desired.

SUMMARY

The present disclosure has been made in consideration of such problems, and a purpose thereof is to provide an entry-and-exit assistance device for a vehicle in which a motion to move a board between a using state (using position) and a housed state (housed position) can be made easy and an improvement in usability can be intended.

To achieve the above goals, the present disclosure is an entry-and-exit assistance device for a vehicle, the entry-and-exit assistance device being provided on a vehicle-width-direction outer side of a seat adjacent to a door opening of a vehicle, the entry-and-exit assistance device including: a board that is rotatable between a horizontal posture in which the board becomes generally horizontal and an orthogonal posture in which the board is generally orthogonal to a vehicle width direction in a vehicle cabin; a support portion that is a support portion of the board provided between the board and a vehicle body and is rotatable between a seat side-portion position on a vehicle-width-direction outer side of the seat and a flipped-up position in which the support portion is flipped up to a vehicle front side or a vehicle rear side of the seat side-portion position; and a linking mechanism that is provided between the board and the vehicle body and links rotation of the support portion with rotation of the board.

The entry-and-exit assistance device is characterized in that the board is pivotally supported by the support portion to be rotatable around an axis line orthogonal to the vehicle width direction and is supported by the support portion to maintain the horizontal posture when the board is in the horizontal posture, the support portion is pivotally supported by the vehicle body to be rotatable around an axis line extending in the vehicle width direction, and the linking mechanism is configured to cause the board to be rotated to a vehicle-width-direction inner side with respect to the support portion and take the orthogonal posture when the support portion is rotated from the seat side-portion position to the flipped-up position and to cause the board to be rotated to a vehicle-width-direction outer side with respect to the support portion and take the horizontal posture when the support portion is rotated from the flipped-up position to the seat side-portion position.

According to the present disclosure, in such a configuration, the board is rotated to the vehicle-width-direction inner side with respect to the support portion and takes the orthogonal posture while linking with rotation of the support portion from the seat side-portion position to the flipped-up position, and the board is rotated to the vehicle-width-direction outer side with respect to the support portion and takes the horizontal posture while linking with rotation of the support portion from the flipped-up position to the seat side-portion position. Consequently, displacement of the entry-and-exit assistance device for a vehicle between a using state (a state where the support portion is positioned in the seat side-portion position and the board takes the horizontal posture) and a housed state (a state where the support portion is in the flipped-up position and the board takes the orthogonal posture) can be performed by one action (one motion).

Further, in the present disclosure, the linking mechanism preferably includes a link member that couples the board with the vehicle body, in the link member, one end in a longitudinal direction is preferably coupled with a predetermined part of a lower surface of the board in the horizontal posture via a first universal joint, another end in the longitudinal direction is preferably coupled with a predetermined part of the vehicle body via a second universal joint, the predetermined part of the vehicle body is preferably a part spaced apart from a pivotally supporting part of the support portion to the vehicle body to a vehicle front side or a vehicle rear side as a side to which the support portion is flipped up, and the linking mechanism is preferably configured such that when the support portion is rotated to the flipped-up position, the predetermined part of the board with which the one end of the link member in the longitudinal direction is coupled comes to a position spaced apart from an axis line of a pivotally supporting part of the board to the support portion to a vehicle front side or a vehicle rear side as a side to which the support portion is flipped up.

According to the present disclosure, in such a configuration, as described above, by simple configurations such as the link member and the universal joints (first universal joint and second universal joint), the displacement of the entry-and-exit assistance device for a vehicle between the using state and the housed state can be performed by one action.

Further, in the present disclosure, the linking mechanism is preferably configured such that when the support portion is in the flipped-up position, the board in the orthogonal posture is positioned on a vehicle front side or a vehicle rear side as a side to which the support portion is flipped up and in a vicinity with respect to an assist grip of a door inner wall in a case where a door of the door opening is closed.

According to the present disclosure, in such a configuration, when the door is closed and the support portion is about to be rotated from the flipped-up position to the seat side-portion position, the board in the orthogonal posture abuts the assist grip, and the support portion can thus be restrained from being unintentionally rotated to the seat side-portion position in rapid acceleration or deceleration or the like of the vehicle, for example.

Further, in the present disclosure, the entry-and-exit assistance device for a vehicle preferably further includes: between the support portion and the vehicle body, urging means for urging the support portion from the seat side-portion position to the flipped-up position; and a damper that brakes a speed of displacement from the flipped-up position to the seat side-portion position.

According to the present disclosure, in such a configuration, an influence of the masses (inertia) of the support portion and the board in an operation for rotating the support portion between the seat side-portion position and the flipped-up position can be buffered, and as a result, operability in the above-described operation can be enhanced (an operation feeling can be made soft). Further, the support portion can be held in the flipped-up position such that the support portion positioned in the flipped-up position is not unintentionally tilted to the seat side-portion position side due to rapid acceleration or deceleration or the like of the vehicle.

Further, in the present disclosure, the support portion is preferably provided with a protruding portion that supports the board from below when the board is in the horizontal posture, on a lower surface of the board, a cover member is preferably provided that covers at least a part of the protruding portion of the support portion when the board is in the orthogonal posture, and the cover member is preferably formed such that the protruding portion is housed in an inner space of the cover member when the support portion is rotated from the flipped-up position to the seat side-portion position.

According to the present disclosure, in such a configuration, because the cover member that covers at least a part of a board-supporting protruding portion is provided on the lower surface of the board and the cover member is formed such that the protruding portion is housed in the inner space of the cover member when the support portion is rotated from the flipped-up position to the seat side-portion position, a finger of an occupant can be prevented from being caught between the support portion and the board due to linkage between rotation of the support portion and rotation of the board. In particular, the occupant can be prevented from rotating the support portion by mistakenly gripping and operating the board-supporting protruding portion, and a finger of the occupant can thereby be prevented from being caught.

According the present disclosure, a motion to move a board between a using state (using position) and a housed state (housed position) can be made easy, and an improvement in usability can be intended.

BRIEF DESCRIPTION OF THE DRAWINGS

FIG. 3 is a right side view illustrating the entry-and-exit assistance device of this embodiment and portions around that.

FIG. 4 is a plan view illustrating the entry-and-exit assistance device of this embodiment and portions around that.

FIGS. 14A1-14C2 show an enlarged view (FIG. 14A1) of an arrow A' in FIG. 11, an enlarged view (FIG. 14A2) of an arrow A, an enlarged view (FIG. 14B1) corresponding to the arrow A' in the state during the movement, an enlarged view (FIG. 14B2) of an arrow B, an enlarged view (FIG. 14C1) corresponding to the arrow A' in the housed state, and an enlarged view (FIG. 14C2) of an arrow C.

FIGS. 16A-16B show a side view (FIG. 16A) and a rear perspective view (FIG. 16B) that illustrate a support projection of a support portion and a cover member of a board in the housed state of the entry-and-exit assistance device of this embodiment.

DETAILED DESCRIPTION

Figure 1:
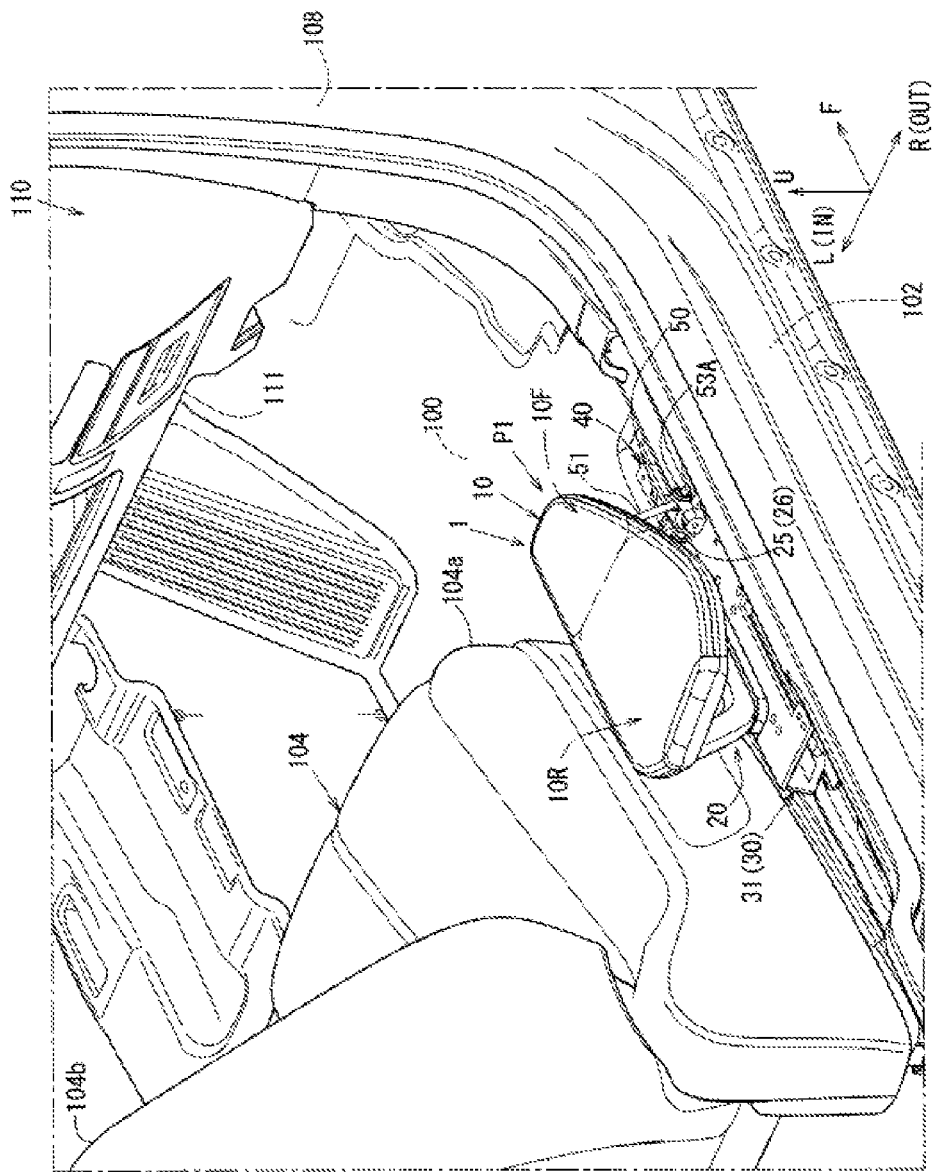
FIG. 1 is a perspective view in which an entry-and-exit assistance device of this embodiment in a using state and portions around that are seen from vehicle rear and a vehicle-width-direction outer side.

One embodiment of the present disclosure will hereinafter be described with reference to the drawings. A vehicle including an entry-and-exit assistance device of this embodiment will be described by using FIG. 1 to FIG. 14C2.

Further, in the drawings, an arrow F indicates a vehicle front direction, an arrow R indicates a vehicle right direction, an arrow L indicates a vehicle left direction, an arrow U indicates a vehicle upper direction, an arrow OUT indicates a vehicle-width-direction outer side, and an arrow IN indicates a vehicle-width-direction inner side.

As illustrated in FIG. 1 to FIG. 4, a vehicle V of this embodiment includes, in a lower surface of a vehicle cabin, a floor panel 100 (see FIG. 4) that forms a floor (floor surface) of the vehicle cabin, a floor tunnel 101 (see FIG. 4) that extends in a vehicle front-rear direction above a central position of the floor panel 100 in a vehicle width direction, side sills 102 that extend in the vehicle front-rear direction on lateral sides of the floor panel 100, and plural floor cross members (not illustrated) that couple the floor tunnel 101 and the side sills 102 together in the vehicle width direction.

In a front portion of the vehicle cabin, front seats are disposed to be aligned in the vehicle width direction (only a driver seat 104 is illustrated). The front seats are formed with the driver seat 104 that is disposed on a right side with respect to the floor tunnel 101 in a right-hand drive vehicle as in this embodiment and a passenger seat (not illustrated) that is disposed on a left side with respect to the floor tunnel 101. The driver seat 104 and the passenger seat are configured with left and right independent separate seats each of which has a seat cushion 104a, a seat back 104b, and a headrest 104c.

Figure 3:
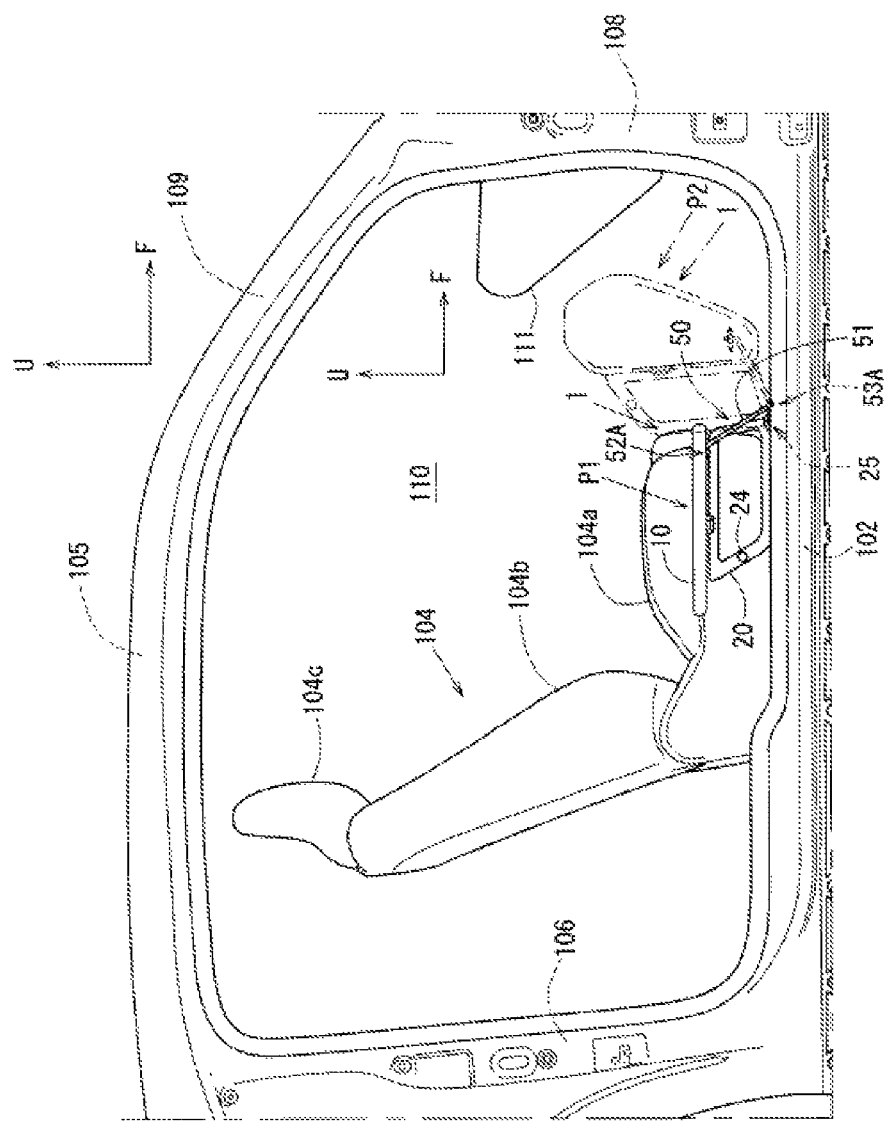

Further, as illustrated in FIG. 3, in a side portion of the vehicle V of this embodiment, a door opening 110 is formed that is surrounded by a roof side rail 105, a rear pillar 106, the side sill 102, and a hinge pillar 108 and a front pillar 109 on a vehicle front side.

Note that although not illustrated, the roof side rail 105, the rear pillar 106, the side sill 102, the hinge pillar 108, and the front pillar 109 are vehicle-body frame members each of which has a closed cross-section structure extending in an extension direction.

The door opening 110 is a doorway through which an occupant enters and exits the vehicle, and the vehicle includes a side door 112 (see FIG. 9) that is mounted on the hinge pillar 108 (not illustrated) on the vehicle front side via a pair of upper and lower door hinges (not illustrated) so as to be capable of being opened and closed. The vehicle V of this embodiment is a two-door vehicle in which one side door 112 (on only a vehicle right side is illustrated) is provided to a side portion on each of left and right sides of a vehicle body. Note that the entry-and-exit assistance device 1 described later is not limited to application to a two-door vehicle as the vehicle of this embodiment but may be applied to a four-door vehicle, for example, a vehicle including so-called pillarless double doors, a vehicle including a sliding door, and so forth.

Note that although the vehicle V of this embodiment does not have a center pillar, which demarcates the door opening 110 into front and rear portions, in a vehicle-body side portion, a reinforcement member extending in a vehicle up-down direction (so-called door-built-in center pillar) is built in the side door 112 (not illustrated).

Figure 4:
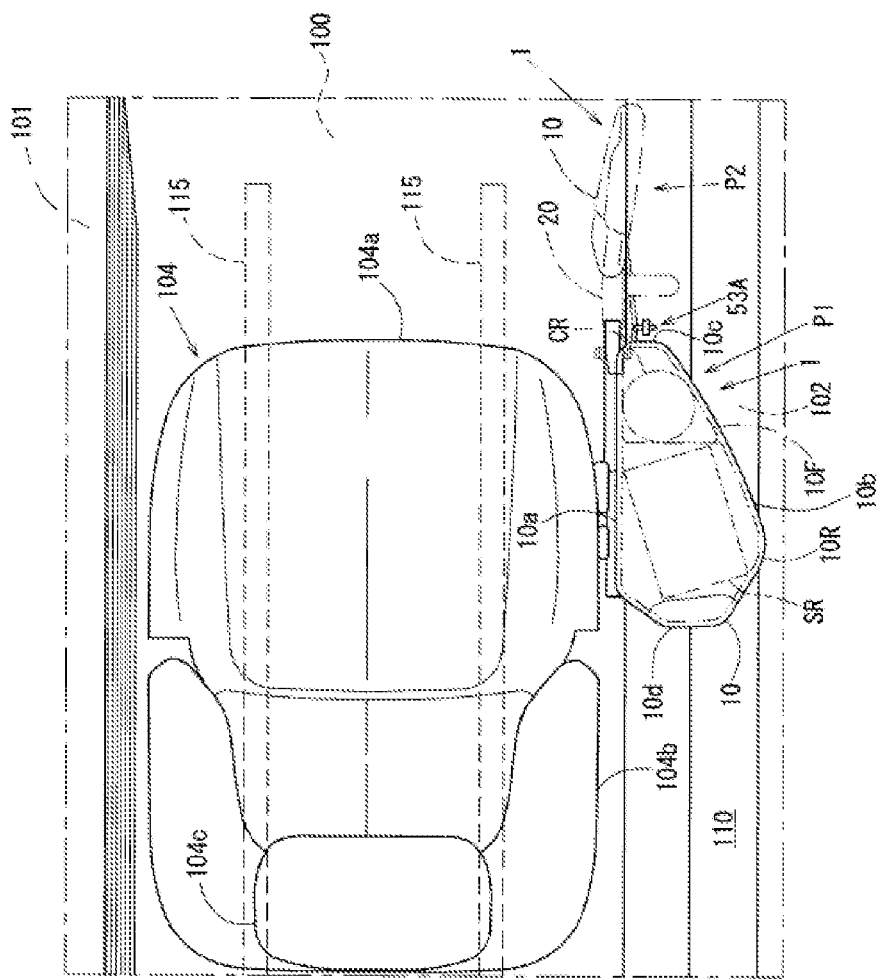

As illustrated in FIG. 1, FIG. 3, and FIG. 4, the entry-and-exit assistance device 1 of this embodiment is installed in a vehicle-width-direction outer side position of the driver seat 104 that is adjacent to the door opening 110 on the vehicle right side in the above-described vehicle.

As illustrated in FIG. 1 to FIG. 5, the entry-and-exit assistance device 1 is a device on which buttocks or the like of the occupant is temporarily placed when the occupant with disabled lower limbs enters or exits the vehicle and moves between the driver seat 104 and a wheelchair on the outside of the vehicle and which thereby assists movement of the occupant between the driver seat 104 and the wheelchair.

Figure 5:
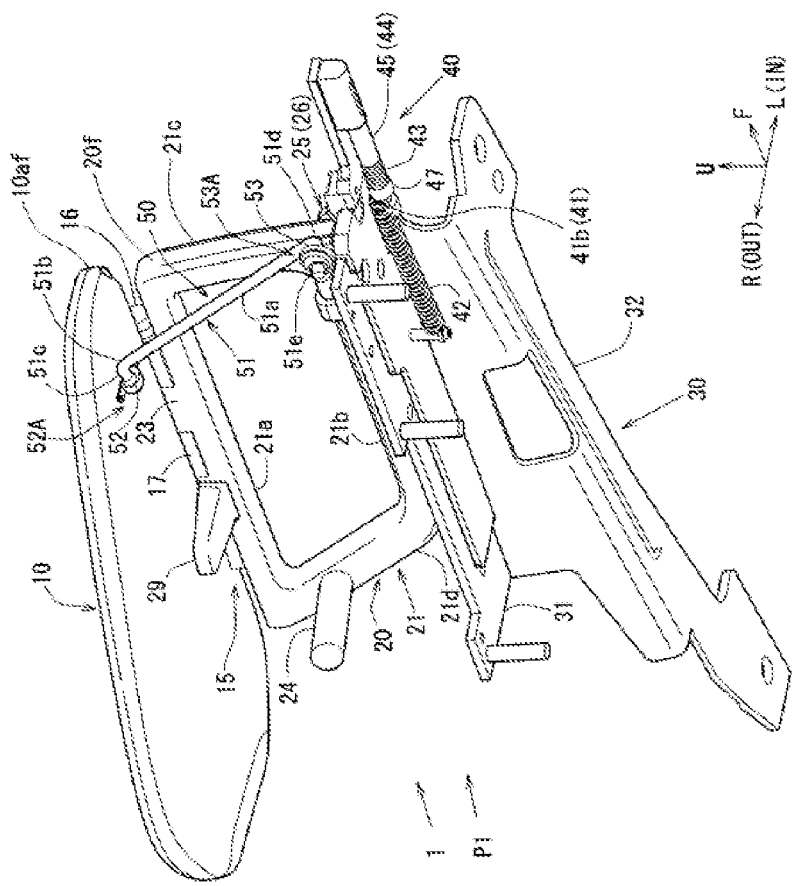
FIG. 5 is a perspective view in which the entry-and-exit assistance device of this embodiment is seen from the vehicle-width-direction outer side and a lower side.

As illustrated in FIG. 1 and FIG. 5, the entry-and-exit assistance device 1 includes a board 10, a support portion 20, a base 30, and a linking mechanism 50.

Figure 6:
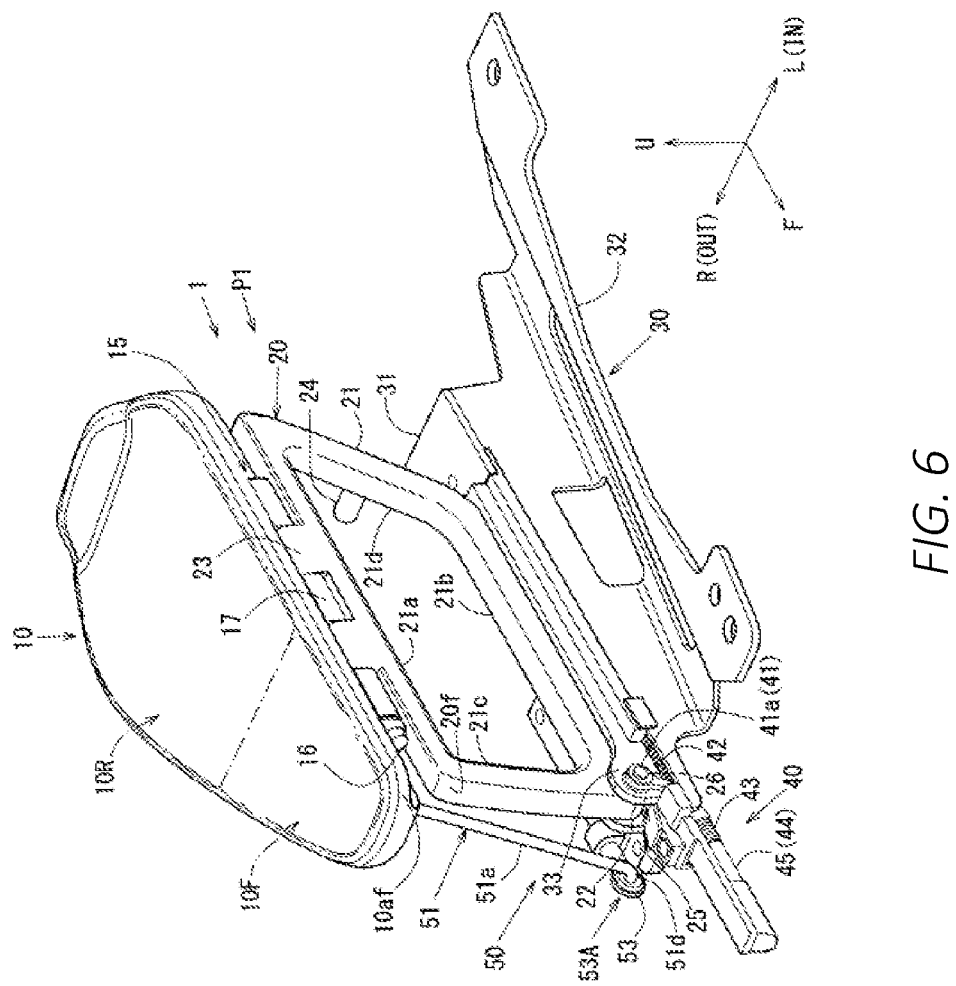
FIG. 6 is a perspective view in which the entry-and-exit assistance device of this embodiment is seen from a vehicle-width-direction inner side and an upper side.

In addition, as illustrated in FIG. 5 and FIG. 6, the entry-and-exit assistance device 1 includes a board rotation shaft portion 15 that pivotally supports the board 10 such that the board 10 is ratable with respect to the support portion 20 and a support-portion rotation shaft portion 25 that pivotally supports the support portion 20 such that the support portion 20 is rotatable with respect to the vehicle body.

As illustrated in FIG. 1, FIG. 3, and FIG. 4, when the support portion 20 is positioned in a vehicle-width-direction outer side position (P1) (hereinafter, referred to as "seat side-portion position (P1)") of the driver seat 104, the board 10 is configured to be capable of being arranged to take a generally horizontal posture (P1) (hereinafter, referred to as "horizontal posture (P1)").

The board 10 is formed into a plate shape having a size and strength that enable the occupant to temporarily place his/her buttocks or to place (put) a hand for supporting an upper body of the occupant by an arm in the horizontal posture (P1). As illustrated in FIG. 1, FIG. 4, and FIG. 6, in a vehicle plan view in the horizontal posture (P1), the board 10 is formed to have a narrow-width region 10F in a front-side section and is formed to have a wide-width region 10R having a wider width than the narrow-width region 10F in a rear-side section. The narrow-width region 10F is formed to have a necessary and sufficient size as a hand-putting region on which the occupant puts a hand and supports his/her body when the occupant (for example, a lower-limb disabled person) is transferred between seats of the wheelchair (not illustrated) and the driver seat 104 via the board 10.

The wide-width region 10R is formed to have a size that enables the buttocks (a portion between a pair of left and right ischial bones and portions around those) or the like of the occupant to be temporarily placed (supported).

Specifically, as illustrated in FIG. 4, the narrow-width region 10F is formed slightly larger than a circular region CR to include an imaginary circular region CR with a diameter of approximately 80 mm, and the wide-width region 10R is formed as a shape that covers a rectangular region SR to include an imaginary rectangular region (also referred to as "buttock temporary placement region") SR whose length in the vehicle front-rear direction is approximately 220 mm and whose length in the vehicle width direction is approximately 110 mm.

In other words, as illustrated in FIG. 4, in the vehicle plan view in the horizontal posture (P1), in the board 10, a vehicle-width-direction inner edge 10a is generally linearly formed in a direction generally agreeing with the vehicle front-rear direction throughout the narrow-width region 10F and the wide-width region 10R. Meanwhile, a vehicle-width-direction outer edge 10b is formed into an inclined shape that is gradually positioned on the vehicle-width-direction outer side from the front to the rear.

In addition, in the vehicle plan view in the horizontal posture (P1), in the board 10, a front edge 10c of the board 10 is formed into a curved shape that protrudes to vehicle front throughout a portion between the vehicle-width-direction inner edge 10a and the vehicle-width-direction outer edge 10b in the vehicle width direction, and a rear edge 10d of the board 10 is formed into a curved shape that protrudes to vehicle rear throughout a portion between the vehicle-width-direction inner edge 10a and the vehicle-width-direction outer edge 10b in the vehicle width direction.

As illustrated in FIG. 3, FIG. 5, and FIG. 6, the support portion 20 is provided in a part of the board 10 in the vehicle front-rear direction, the part corresponding to at least the narrow-width region 10F. Accordingly, the support portion 20 is configured to support at least the narrow-width region 10F of the board 10 in the vehicle front-rear direction from immediately below. In this embodiment, the support portion 20 is provided corresponding to a section of the board 10 that is positioned throughout the narrow-width region 10F and the wide-width region 10R.

The support portion 20 is configured to support the board 10 in the horizontal posture (P1) from at least the inner edge 10a side in the vehicle width direction via the board rotation shaft portion 15 in a cantilever shape. The board rotation shaft portion 15 is disposed along the vehicle front-rear direction immediately below the inner edge 10a side in the vehicle width direction in the board 10 in the horizontal posture (P1).

As illustrated in FIG. 5 and FIG. 6, the support portion 20 is provided such that the position of its front end 20f becomes a position corresponding to a front end 10af of the vehicle-width-direction inner edge 10a of the board 10 (narrow-width region 10F). Accordingly, at least the narrow-width region 10F of the board 10 is supported by the support portion 20 throughout the generally whole narrow-width region 10F in the vehicle front-rear direction.

Figure 2:
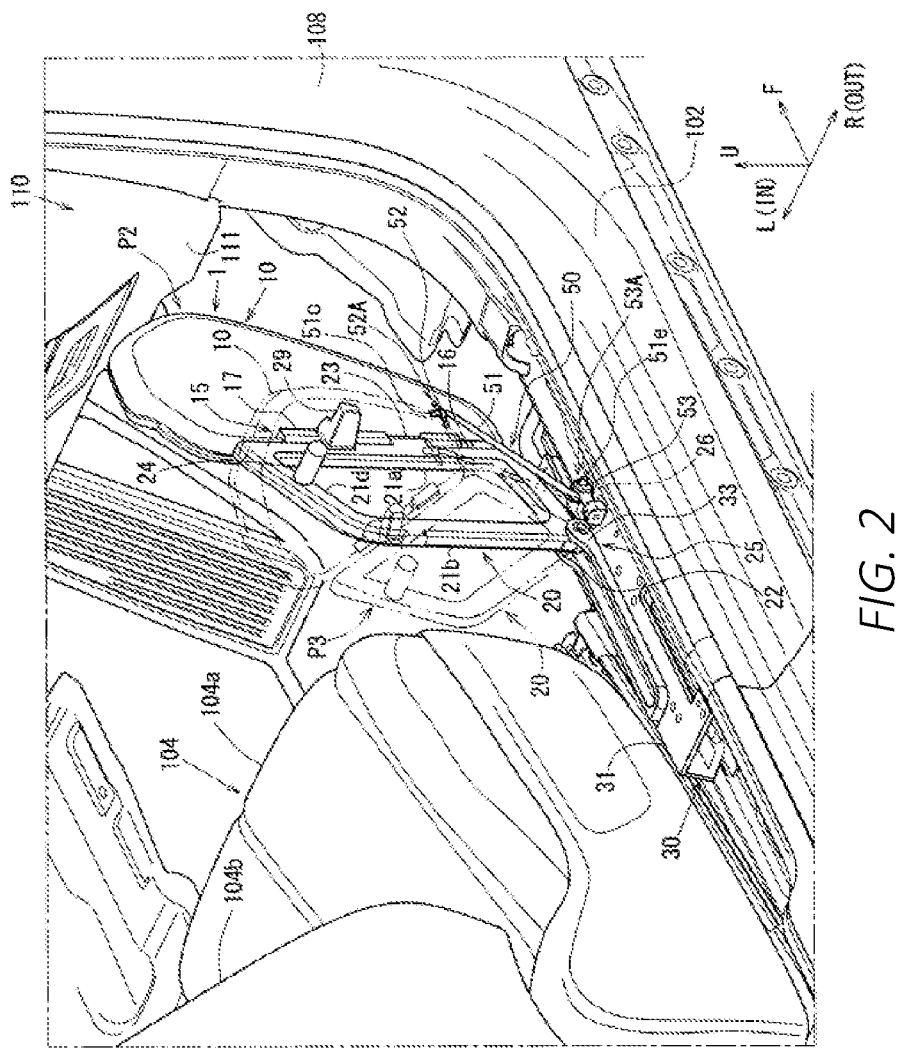
FIG. 2 is a perspective view in which the entry-and-exit assistance device of this embodiment in a housed state and portions around that are seen from the vehicle rear and the vehicle-width-direction outer side and which together illustrates a state during movement from the using state to the housed state.
Figure 7:
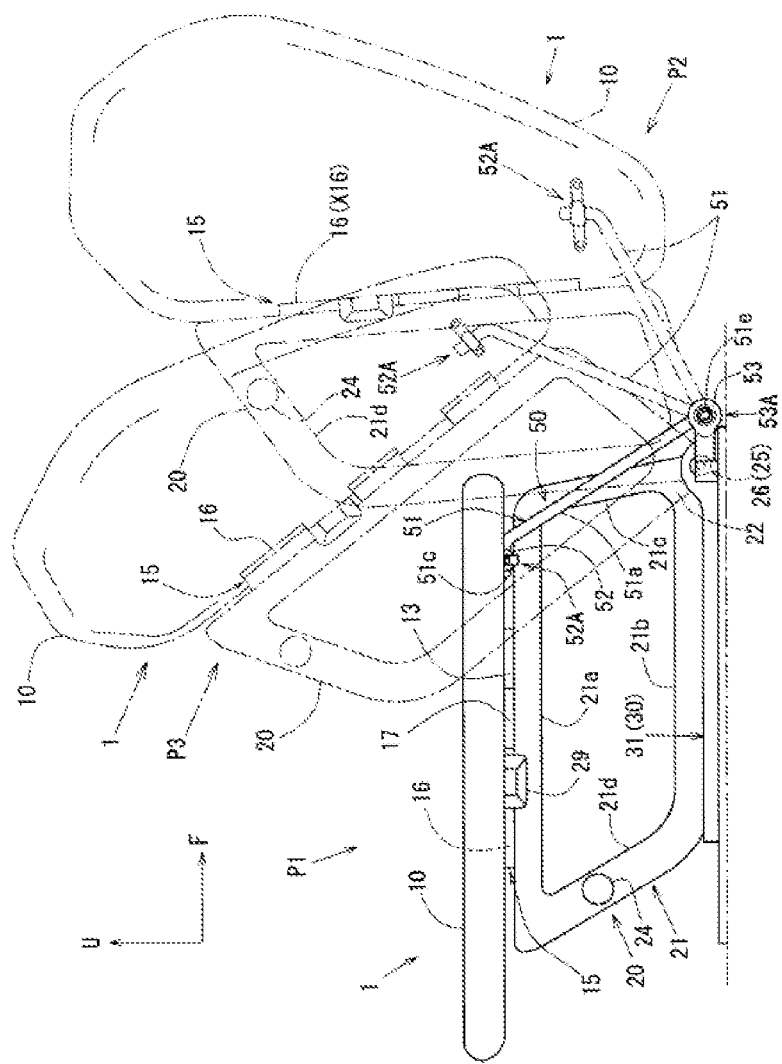
FIG. 7 is a side view illustrating the using state, the housed state of the entry-and-exit assistance device of this embodiment, and the state during the movement between those.

As illustrated in FIG. 2, FIG. 6, and FIG. 7, the support portion 20 is disposed above the base 30 and is pivotally supported to be rotatable in a vehicle side view, that is, rotatable around an axis line (shaft 26) extending in the vehicle width direction.

As illustrated in FIG. 5 to FIG. 7, the support portion 20 includes a frame-shaped member 21 that is formed into a frame shape (closed ring shape) in the vehicle side view with an upper side portion 21a that generally horizontally extends in the vehicle front-rear direction in the seat side-portion position (P1), a lower side portion 21b that extends in the vehicle front-rear direction in generally parallel with the upper side portion 21a in a position spaced apart downward from the upper side portion 21a, a front side portion 21c that connects together front ends of the upper side portion 21a and the lower side portion 21b in the vehicle up-down direction, and a rear side portion 21d that connects together rear ends of the upper side portion 21a and the lower side portion 21b in the vehicle up-down direction.

In this embodiment, the upper side portion 21a is formed longer in the vehicle front-rear direction than the lower side portion 21b, and the rear side portion 21d is formed in an inclined formation in which a higher portion is positioned rearward. Accordingly, the frame-shaped member 21 is formed into a trapezoidal shape in the vehicle side view (see FIG. 3 and FIG. 7).

As illustrated in FIG. 2, FIG. 5, and FIG. 7, with the support portion 20, in a position on a slightly rear side of an intermediate position of the upper side portion 21a in the vehicle front-rear direction, a support projection (protruding portion) 29 is integrally formed that generally horizontally protrudes from the position on the rear side to the vehicle-width-direction outer side. An upper surface of the support projection 29 abuts a lower surface 10e of the board 10 in the horizontal posture (P1), and the support projection 29 thereby supports the board 10 from a lower side. That is, in the horizontal posture (P1), the board 10 is supported from below by the support projection 29 in the support portion 20 and the above-described board rotation shaft portion 15. Note that the support projection 29 may not integrally be formed, but a protruding portion as a separate body may be mounted on the support portion 20. Further, as described later, with the lower surface 10e of the board 10, a cover member 11 is integrally formed that covers at least a part of the support projection (protruding portion) 29 (illustrated only in FIG. 16A to FIG. 18B). As for this cover member 11, a cover member as a separate body may also be mounted on the lower surface 10e of the board 10.

As illustrated in FIG. 2 and FIG. 5 to FIG. 7, the above-described support-portion rotation shaft portion 25 is provided between the support portion 20 and the base 30. As illustrated in FIG. 2, FIG. 6, FIGS. 10A and 10B, and FIG. 11, the support-portion rotation shaft portion 25 is configured with the shaft 26 that extends in generally parallel with the vehicle width direction, a support-portion lower-side pivotally supporting portion 22 that is provided to the support portion 20 side and is pivotally supported by the base 30 via the shaft 26, and a pedestal-side pivotally supporting portion 33 that is provided to the base 30 side and is pivotally supported by the support portion 20 via the shaft 26. Note that the support-portion lower-side pivotally supporting portion 22 is provided to a front lower end (a corner portion between the front side portion 21c and the lower side portion 21b) of the support portion 20, and the pedestal-side pivotally supporting portion 33 is provided to a front portion of the base 30.

Accordingly, as illustrated in FIG. 7, in the support-portion rotation shaft portion 25, the support portion 20 is pivotally supported to be rotatable around the axis line (shaft 26) extending in the vehicle width direction with respect to the base 30. In this embodiment, when the support portion 20 is rotated to a position (P2) in which the support portion 20 is flipped up from the seat side-portion position (P1) to the front (hereinafter, referred to as "flipped-up position (P2)"), the support portion 20 is rotated by about 90 degrees clockwise in a vehicle right side view with respect to the vehicle body (base 30). In short, as illustrated in FIG. 2, FIG. 3, and FIG. 7, the support portion 20 is pivotally supported by the base 30 via the above-described shaft 26 between the seat side-portion position (P1) and the flipped-up position (P2).

As illustrated in FIG. 5 to FIG. 7, the above-described board rotation shaft portion 15 is provided between the board 10 and the support portion 20. The board rotation shaft portion 15 is configured with a shaft 16 that extends in generally parallel with the vehicle front-rear direction (that is, the upper side portion 21a) when the board 10 is in the horizontal posture (P1), a board-side pivotally supporting portion 17 that is provided to the vehicle-width-direction inner edge 10a (see FIG. 4) side of the board 10 and is pivotally supported by the support portion 20 via the shaft 16, and a support-portion upper-side pivotally supporting portion 23 that is provided to the upper side portion 21a of the support portion 20 and is pivotally supported by the board 10 via the shaft 16.

Accordingly, in the board rotation shaft portion 15, the board 10 is pivotally supported to be rotatable around an axis line (shaft 16) extending in the vehicle front-rear direction with respect to the support portion 20.

In short, as illustrated in FIG. 7, the board 10 is pivotally supported by the support portion 20 via the shaft 16 so as to take the horizontal posture (P1) when the support portion 20 is positioned in the seat side-portion position (P1) and to take a posture generally orthogonal to the vehicle width direction (hereinafter, referred to as "orthogonal posture (P2)") when the support portion 20 is positioned in the flipped-up position (P2).

In this embodiment, the orthogonal posture (P2) denotes a posture in which the board 10 is rotated by about 90 degrees around the board rotation shaft portion 15 extending along the vehicle-width-direction inner edge 10a of the board 10, as a center, such that the board 10 stands up from the horizontal posture (P1) with respect to the support portion 20.

The entry-and-exit assistance device 1 of this embodiment is set to a using state P1 (usable state) when the support portion 20 is positioned in the seat side-portion position (P1) and the board 10 takes the horizontal posture (P1). The entry-and-exit assistance device 1 is set to a housed state P2 when the support portion 20 is positioned in the flipped-up position (P2) and the board 10 takes the orthogonal posture (P2) (see FIG. 7).

As illustrated in FIG. 1 and FIG. 3, when the board 10 is in the horizontal posture (P1) (the entry-and-exit assistance device 1 is in the using state P1), the board 10 is set to a state where at least an outer side portion of the wide-width region 10R in the vehicle width direction juts out, to the vehicle-width-direction outer side, to a part that overlaps with the position of the closed side door 112 (see FIG. 9), in other words, to a part that overlaps with the side sill 102 in the vehicle width direction.

Figure 9:
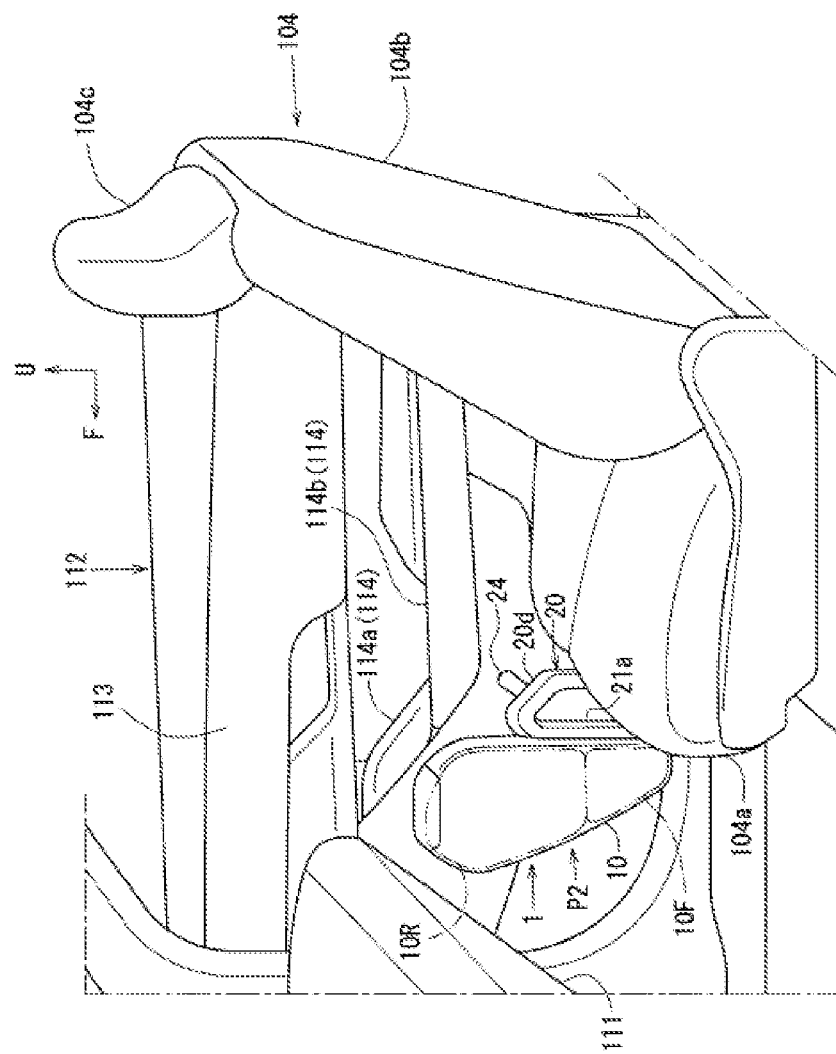
FIG. 9 is a perspective view in which the entry-and-exit assistance device of this embodiment in the housed state and portions around that are seen from a vehicle cabin side when a side door is closed.

Further, as illustrated in FIG. 2 and FIG. 9, in the housed state P2, the entry-and-exit assistance device 1 is positioned on the vehicle-width-direction inner side with respect to a vehicle-width-direction inner surface (door trim 113) of the closed side door 112 and on the vehicle-width-direction outer side of a foot-side space (a space in front of and below a dashboard (also referred to as "instrument panel" 111) of the driver seat 104. That is, the entry-and-exit assistance device 1 according to this embodiment is positioned in the vicinity of the vehicle-width-direction inner surface of the closed side door 112.

Thus, when the side door 112 is closed, the entry-and-exit assistance device 1 in the housed state P2 does not interfere with the side door 112 and further can secure a foot-side space of the occupant seated on the driver seat 104.

Incidentally, as illustrated in FIG. 9, in the orthogonal state (P2), the board 10 takes a standing posture in which the wide-width region 10R is positioned above the narrow-width region 10F. In this case, the support portion 20 in the flipped-up position (P2) takes a forward-inclined posture in which the upper side portion 21a extends along a generally up-down direction and is positioned at a front end of the support portion 20. That is, as illustrated in FIG. 2, FIG. 7, and FIG. 9, the generally whole board 10 in an upright posture is positioned in front of the front end (upper side portion 21a) of the support portion 20, and an upper portion of the board 10 in the orthogonal posture (P2) protrudes above an upper end (rear side portion 21d) of the support portion 20. As illustrated in FIG. 9, a configuration is made such that when the side door 112 is closed, protrusion portions 114 such as an assist grip 114a and an armrest 114b that are provided to protrude from the door trim 113 forming the vehicle-width-direction inner surface of the side door 112 to the vehicle-width-direction inner side are positioned in the rear vicinity of the upper portion of the board 10 in the orthogonal posture (P2).

Accordingly, when the board 10 in the upright posture is unintentionally about to be displaced to the vehicle rear during vehicle traveling, at a travel start of the vehicle, or the like, the upper portion of the board 10 abuts the assist grip 114a provided to the side door 112 or a front portion of the armrest 114b when the door is closed, and the board 10 is thereby restrained from being displaced to the vehicle rear.

Further, as illustrated in FIG. 2, FIG. 5, and FIG. 6, in the above-described support portion 20, a grip portion (a rotation operation portion of the support portion 20 for the occupant) 24 is integrally provided with the frame-shaped member 21, the grip portion 24 being gripped by the occupant when the occupant enters or exits the vehicle and rotates the support portion 20, to the vehicle rear, from the flipped-up position (P2) to the seat side-portion position (P1).

The grip portion 24 is positioned on the outside of a rotation range of the board 10 with respect to the support portion 20 (a rotation range between the horizontal posture (P1) and the orthogonal posture (P2)) and is provided in a position in the rear of a rear end of the board 10 in the orthogonal posture (P2).

Here, when the support portion 20 is in the flipped-up position (P2), the rear side portion 21d is positioned in an upper portion of the support portion 20. Thus, the grip portion 24 in this embodiment generally horizontally extends from a halfway portion (intermediate portion) of the rear side portion 21d, in the longitudinal direction, of the support portion 20, to the vehicle-width-direction outer side such that the grip portion 24 is easily gripped by the occupant seated on the driver seat 104 (see FIG. 9).

As illustrated in FIG. 2, the base 30 is disposed between the side sill 102 on the vehicle right side and the driver seat 104. As illustrated in FIG. 5 and FIG. 6, the base 30 includes a pedestal portion 31 that has an upper surface horizontally formed to be capable of supporting the whole lower side portion 21b of the support portion 20 from a lower side and a vehicle-body-mounted portion 32 that extends from a lower portion of the pedestal portion 31 to the vehicle-width-direction inner side and is fastened and fixed to the vehicle body. The pedestal portion 31 is formed to rise upward with respect to the vehicle-body-mounted portion 32 in a step shape.

Incidentally, as illustrated in FIG. 4, above the floor panel 100, a pair of left and right seat rails 115 that support the driver seat 104 slidably in the front-rear direction are disposed to have a distance in the vehicle width direction at which the driver seat 104 is capable of being supported. The pair of left and right seat rails 115 extend in the vehicle front-rear direction, and their front ends and rear ends are respectively supported by a front-side seat bracket and a rear-side seat bracket, although neither of those is illustrated. Specifically, both of the pair of left and right seat rails 115 are fastened to the seat brackets in front and rear portions that correspond to the left and right seat rails 115 by using fastening members (bolts and nuts) (not illustrated).

Note that the front-side and rear-side seat brackets are respectively provided to stand from a front-side floor cross member and a rear-side floor cross member (not illustrated) that extend in the vehicle width direction so as to couple the side sill 102 (see FIG. 4) on the vehicle right side with the floor tunnel 101 (see FIG. 4). Both of those front-side and rear-side floor cross members are vehicle-body frame members that are joined from above to the floor panel 100 such that closed cross-sections extending in the vehicle width direction are configured between the floor cross members and the floor panel 100.

Furthermore, when the seat rail 115 on the vehicle right side (vehicle-width-direction outer side) of the pair of left and right seat rails 115 is fastened to the front-side and rear-side seat brackets corresponding to the seat rail 115, the vehicle-body-mounted portion 32 (see FIG. 5 and FIG. 6) of the base 30 is fastened together with the seat rail 115 on the vehicle right side. That is, the vehicle-body-mounted portion 32 is fastened to both of the seat rail 115 on the vehicle right side and the vehicle body.

In addition, the pedestal portion 31 of the base 30 is mounted on a vehicle-body frame member such as the side sill 102 by a fastening member (not illustrated).

Further, as illustrated in FIG. 5 and FIG. 6, the base 30 includes an inertial force buffering mechanism 40 below an upper surface portion of the pedestal portion 31. This inertial force buffering mechanism 40 will be described later.

Figure 8:
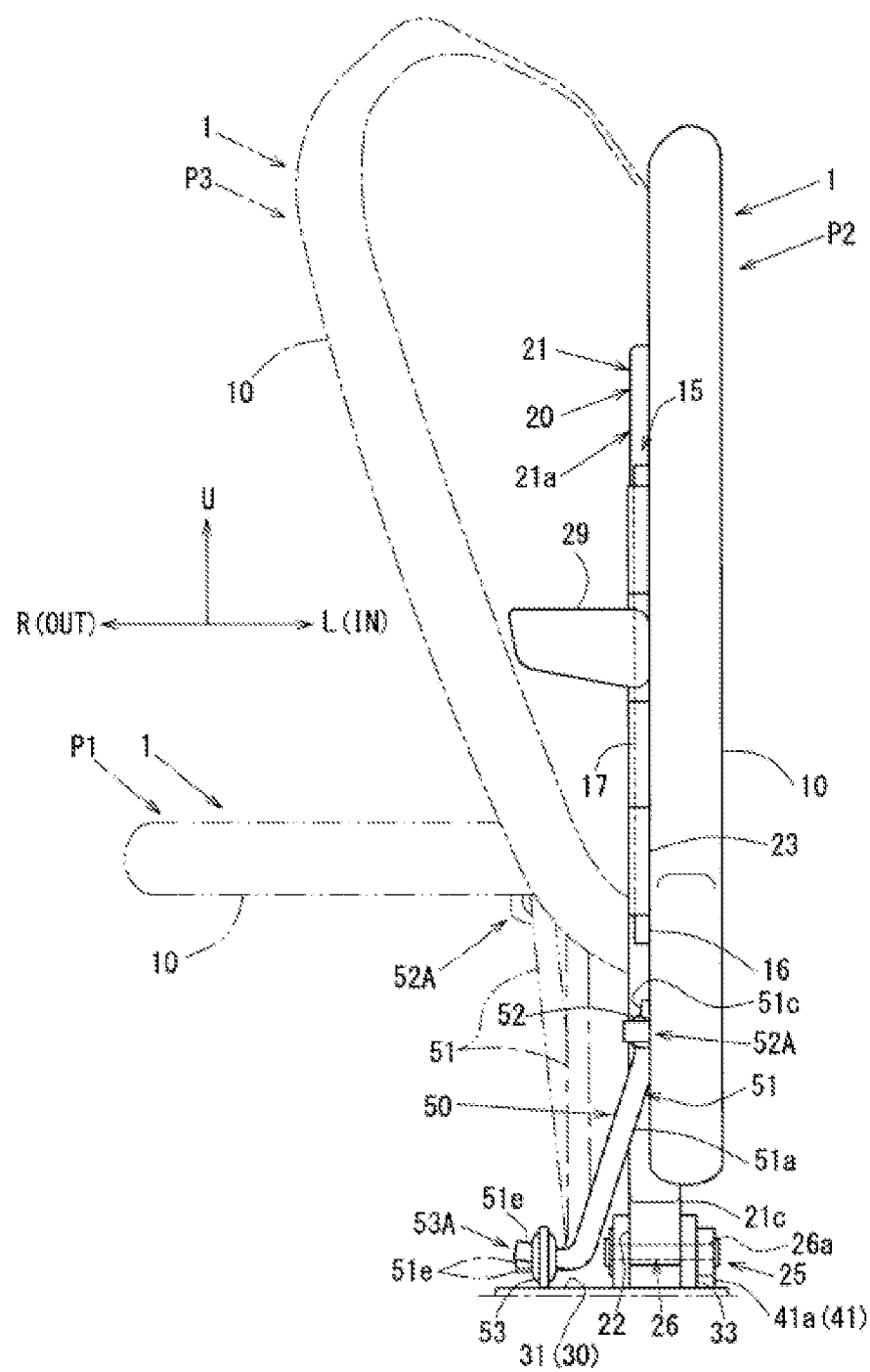
FIG. 8 is a front view illustrating the using state, the housed state of the entry-and-exit assistance device of this embodiment, and the state during the movement between those.

As illustrated in FIG. 1 to FIG. 3, FIG. 5, and FIG. 6, the linking mechanism 50 is provided between the board 10 and the pedestal portion 31 (vehicle body). As illustrated in FIG. 2, FIG. 7, and FIG. 8, the linking mechanism 50 is configured such that while linking with rotation of the support-portion rotation shaft portion 25 of the support portion 20 around the axis line (shaft 26) from the seat side-portion position (P1) to the flipped-up position (P2), the board 10 is rotated around the axis line (shaft 16) of the board rotation shaft portion 15 to the vehicle-width-direction inner side with respect to the support portion 20 and is changed from the horizontal posture (P1) to the orthogonal posture (P2).

In addition, the linking mechanism 50 is configured such that while linking with rotation of the support-portion rotation shaft portion 25 of the support portion 20 around the axis line (shaft 26) from the flipped-up position (P2) to the seat side-portion position (P1), the board 10 is rotated around the axis line (shaft 16) of the board rotation shaft portion 15 to the vehicle-width-direction outer side with respect to the support portion 20 and is changed from the orthogonal posture (P2) to the horizontal posture (P1).

Specifically, as illustrated in FIG. 5, FIG. 7, and FIG. 8, the linking mechanism 50 includes a link member 51 that couples the board 10 with the upper surface of the pedestal portion 31, a first universal joint 52 provided to a joining portion 52A between the link member 51 and the board 10 (hereinafter, referred to as "first joining portion 52A"), and a second universal joint 53 provided to a joining portion 53A between the link member 51 and the upper surface of the pedestal portion 31 (hereinafter, referred to as "second joining portion 53A").

As illustrated in FIG. 5, the link member 51 is integrally formed while having a linear portion 51a for linearly coupling the first universal joint 52 and the second universal joint 53 together, a first shaft portion 51c that protrudes from one end portion of the linear portion 51a in its axial direction via a bent portion 51b bent at about a right angle, and a second shaft portion 51e that protrudes from another end side of the linear portion 51a in its axial direction via a bent portion 51d bent at about a right angle and has such rigidity that the link member 51 is not subject to deflection deformation or bending deformation exceeding a functionally necessary range.

Further, the linear portion 51a of the link member 51 is formed to be longer than the distance between the board 10 in the horizontal posture (P1) and the upper surface of the pedestal portion 31 in the vehicle up-down direction (see FIG. 7).

Figure 11:
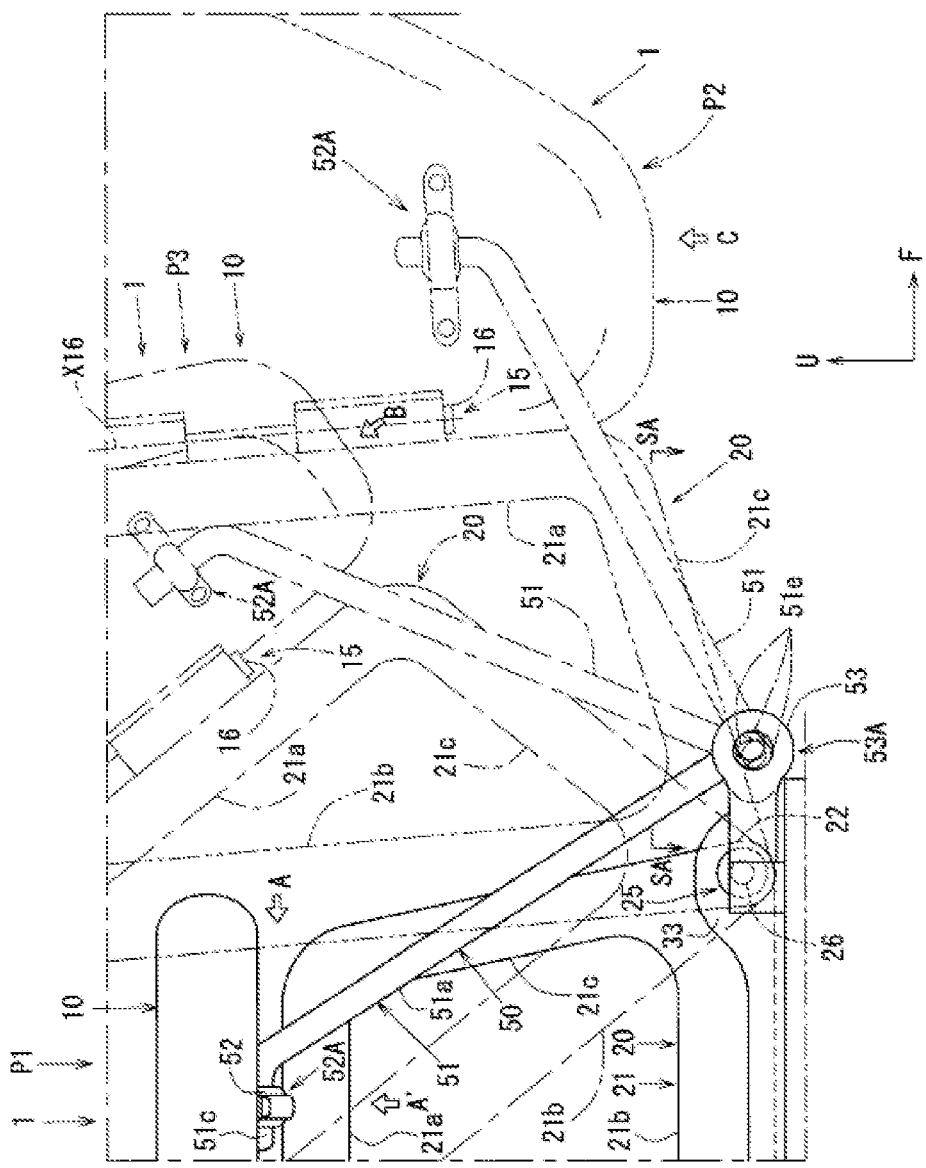
FIG. 11 is an enlarged view of principal components in FIG. 7.
Figure 12:
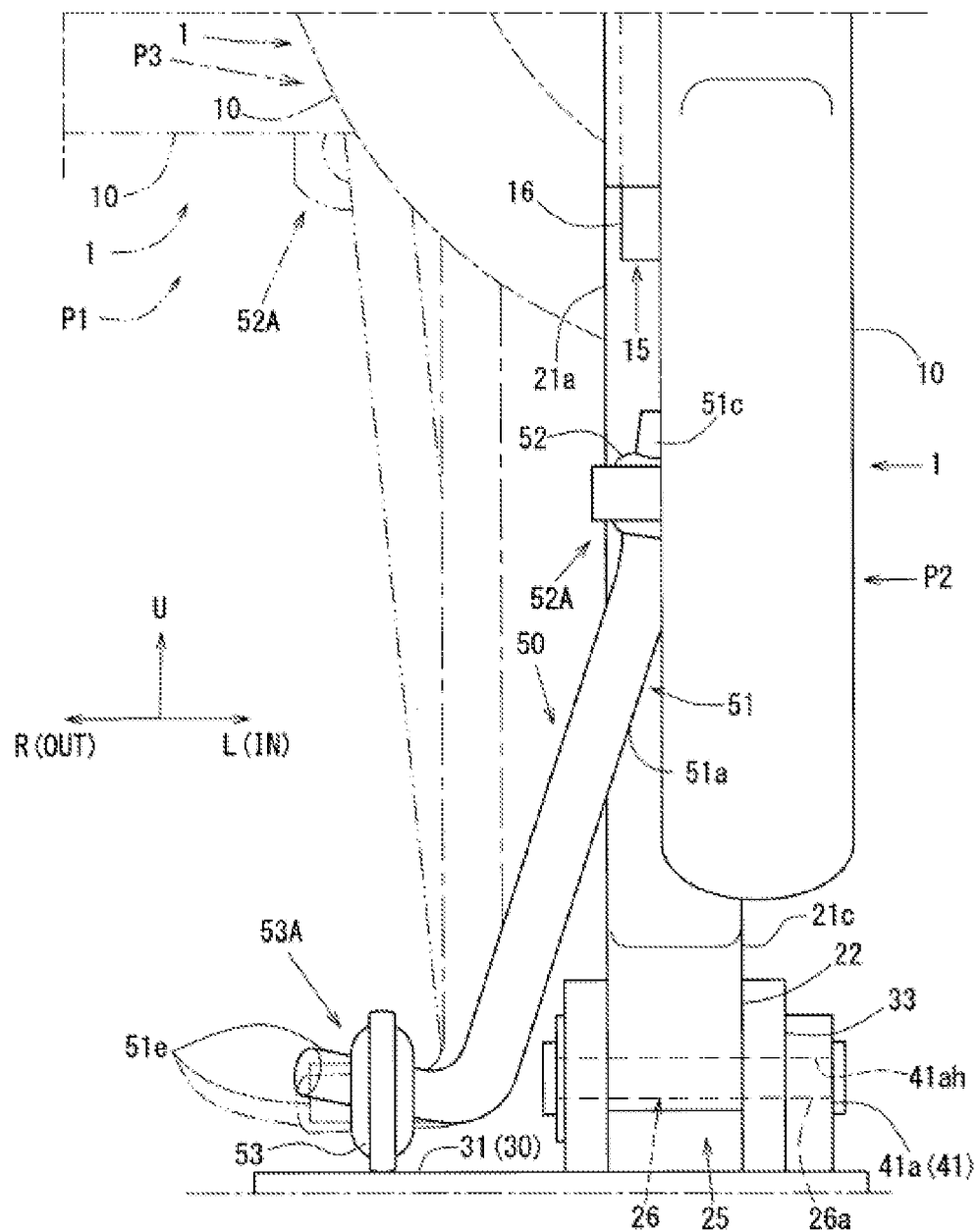
FIG. 12 is an enlarged view of principal components in FIG. 8.

As illustrated in FIG. 5, FIG. 11, and FIG. 12, the first joining portion 52A has the first universal joint 52 and the first shaft portion 51c that is retrained by the first universal joint 52 to be capable of floating. The first joining portion 52A is provided in a front-side position (a generally central position of the narrow-width region 10F) of the lower surface 10e of the board 10 in the horizontal posture (P1) in a plan view (see FIG. 5).

As illustrated in FIG. 5, FIG. 11, and FIG. 12, the second joining portion 53A has the second universal joint 53 and the second shaft portion 51e that is retrained by the second universal joint 53 to be capable of floating. The second joining portion 53A is provided to be spaced apart from the support-portion rotation shaft portion 25 to the vehicle front side and the vehicle-width-direction outer side on the upper surface of the pedestal portion 31 (see FIG. 11 and FIG. 12). Note that the second joining portion 53A is provided on the vehicle front side of a front end of the board 10 in the horizontal posture (see FIG. 11).

In this embodiment, when the board 10 is in the horizontal posture (P1), the first joining portion 52A is positioned on a vehicle rear side of the second joining portion 53A (see FIG. 11) and is positioned on the vehicle-width-direction outer side of the board rotation shaft portion 15 extending along the vehicle front-rear direction (see FIG. 5). In addition, the first joining portion 52A is positioned on the vehicle-width-direction outer side and the vehicle rear side with respect to the support-portion rotation shaft portion 25 (see FIG. 11 and FIG. 12). Note that in this embodiment, as both of the first universal joint 52 and the second universal joint 53, ball joints are employed.

Further, the second joining portion 53A and the support-portion rotation shaft portion 25 are disposed at generally the same height on the upper surface of the pedestal portion 31 of the base 30 such that the distances between the second joining portion 53A and the support-portion rotation shaft portion 25 in the vehicle width direction and the vehicle front-rear direction become shorter than the length of the linear portion 51a of the link member 51.

In addition, as illustrated in FIG. 7, the first joining portion 52A is configured to be positioned on the vehicle front side of a position (axis line) X16 of the shaft 16 of the support-portion upper-side pivotally supporting portion 23 in a state where the support portion 20 is in the flipped-up position (P2). In particular, see the positional relationship between the first joining portion 52A and the axis line X16 of the shaft 16 of the support-portion upper-side pivotally supporting portion 23 in the housed state P2 indicted by imaginary lines in FIG. 7.

Here, when the entry-and-exit assistance device 1 is in the using state P1 (the horizontal posture (P1) of the board 10), as illustrated in FIG. 11, the linear portion 51*a* of the link member 51 takes a posture in which its upper part is positioned on the vehicle rear side with respect to its lower part in the vehicle side view, that is, takes a rearward-inclined posture.

As the entry-and-exit assistance device 1 is displaced from the using state P1 to the housed state P2 (the standing posture of the board 10), the linear portion 51*a* of the link member 51 is gradually rotated such that its upper part is displaced toward the vehicle front in the vehicle side view (see FIG. 11).

Then, when the entry-and-exit assistance device 1 is in the housed state P2, the linear portion 51*a* of the link member 51 takes a posture in which its upper part is positioned in the vehicle front with respect to its lower part in the vehicle side view, that is, takes a forward-inclined posture (see FIG. 11).

In addition, as the linear portion 51*a* of the link member 51 is rotated such that its upper part is displaced to the vehicle front in the vehicle side view as described above, as illustrated in FIG. 8 and FIG. 12, the linear portion 51*a* is rotated such that its upper part is also displaced from the vehicle-width-direction outer side to the inner side in a vehicle front view. Accordingly, when the entry-and-exit assistance device 1 is in the housed state P2, the linear portion 51*a* of the link member 51 takes an inclined posture in which its upper part is positioned on the vehicle-width-direction inner side with respect to its lower part (see FIG. 8 and FIG. 12).

In addition, when the entry-and-exit assistance device 1 is displaced from the using state P1 and the housed state P2, because the link member 51 is three-dimensionally swayed (swung) while the first shaft portion 51*c* is retained by the first universal joint 52 in the first joining portion 52A and the second shaft portion 51*e* is retained by the second universal joint 53 in the second joining portion 53A, the above-described displacement (swing) of the linear portion 51*a* in directions including both of the vehicle front-rear direction and the vehicle width direction is made possible.

Figure 13A:
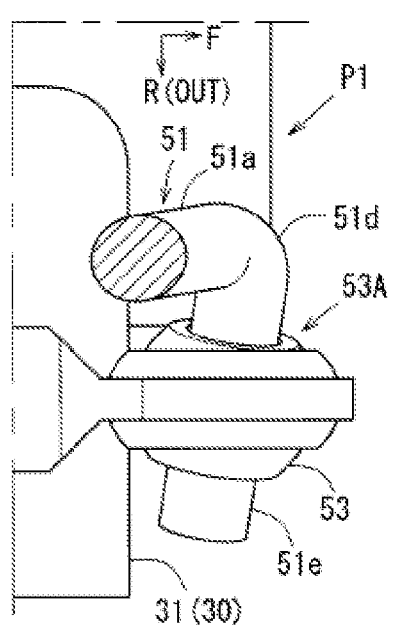
FIGS. 13A-13C show enlarged cross-sectional views taken along lines SA with arrows in FIG. 11 in the using state (FIG. 13A) of the entry-and-exit assistance device of this embodiment, the state during the movement (FIG. 13B), and the housed state (FIG. 13C).

For example, when the entry-and-exit assistance device 1 is in the using state P1, as illustrated in FIG. 11 and FIGS. 14A1 and 14A2, the first joining portion 52A is set to a state where a distal end portion (free end portion) of the first shaft portion 51*c* is retained by the first universal joint 52 in a posture in which the distal end portion is swayed to be directed slightly to the vehicle-width-direction inner side with respect to the vehicle rear. Meanwhile, when the entry-and-exit assistance device 1 is in the using state P1, as illustrated in FIG. 12 and FIG. 13A, the second joining portion 53A is set to a state where a distal end portion (free end portion) of the second shaft portion 51*e* is retained by the second universal joint 53 in a posture in which the distal end portion is swayed to be directed slightly to vehicle lower side and rear with respect to the vehicle-width-direction outer side.

Figure 13B:
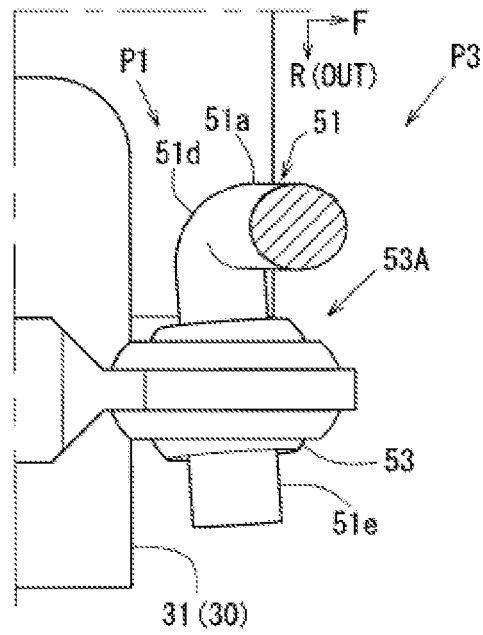

For example, when the entry-and-exit assistance device 1 is in a predetermined moving state P3 between the using state P1 and the housed state P2, as illustrated in FIG. 11 and FIGS. 14B1 and 14B2, the first joining portion 52A is set to a state where the distal end portion of the first shaft portion 51*c* is retained by the first universal joint 52 in a posture in which the distal end portion is directed slightly to a vehicle upper side with respect to the vehicle rear. Meanwhile, when the entry-and-exit assistance device 1 is in the above-described predetermined moving state P3, as illustrated in FIG. 12 and FIG. 13B, the second joining portion 53A is set to a state where the distal end portion of the second shaft portion 51*e* is retained by the second universal joint 53 in a posture in which the distal end portion is swayed to be directed in a direction generally corresponding to the vehicle-width-direction outer side.

Figure 13C:
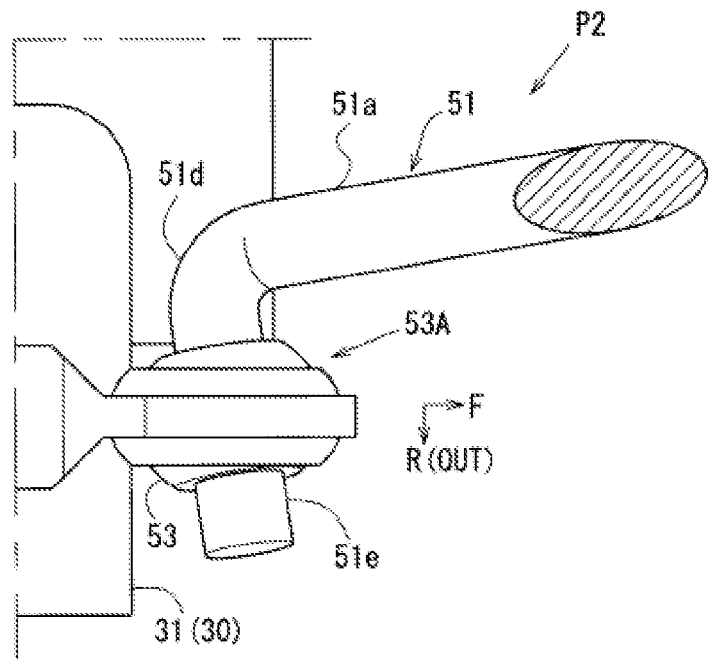

In addition, for example, when the entry-and-exit assistance device 1 is in the housed state P2, as illustrated in FIG. 11 and FIGS. 14C1 and 14C2, the first joining portion 52A is set to a state where the distal end portion of the first shaft portion 51*c* is retained by the first universal joint 52 in a posture in which the distal end portion is swayed to be directed slightly to the vehicle front with respect to the vehicle upper side. Meanwhile, when the entry-and-exit assistance device 1 is in the housed state P2, as illustrated in FIG. 12 and FIG. 13C, the second joining portion 53A is set to a state where the distal end portion of the second shaft portion 51*e* is retained by the second universal joint 53 in a posture in which the distal end portion is swayed to be directed slightly to the vehicle upper side and front with respect to the vehicle-width-direction outer side.

Further, as illustrated in FIG. 5, FIG. 6, and FIGS. 10A and 10B, the above-described inertial force buffering mechanism 40 includes a swinging arm 41, a tension spring 42, a compression spring 43, and a damper 44.

Figure 10A:
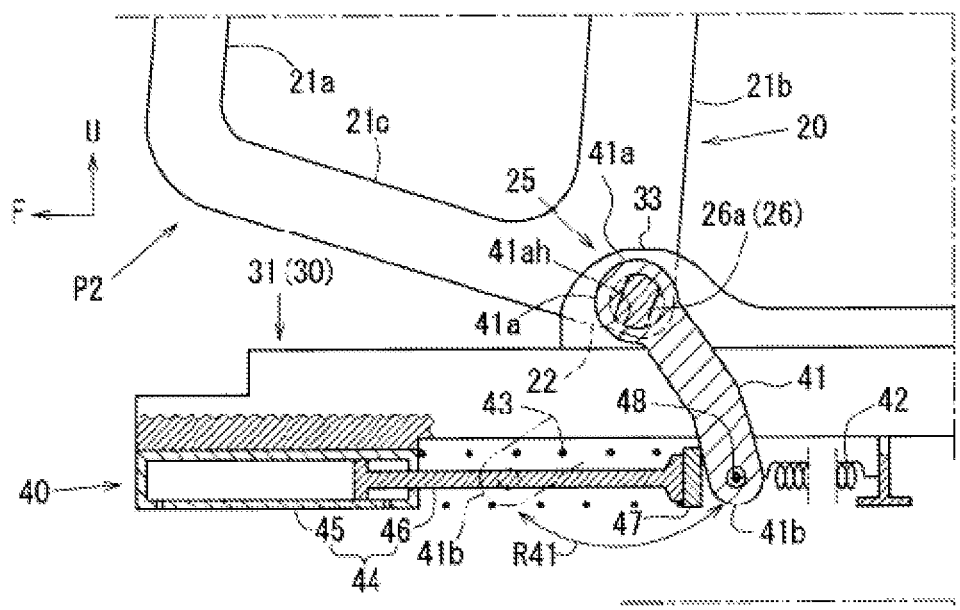
FIGS. 10A-10B show explanatory diagrams schematically illustrating, with partial cross sections, an inertial force buffering mechanism and portions around that in cases where the entry-and-exit assistance device is in the housed state (FIG. 10A) and in the using state (FIG. 10B), the inertial force buffering mechanism and portions around that being seen from the vehicle-width-direction outer side.
Figure 10B:
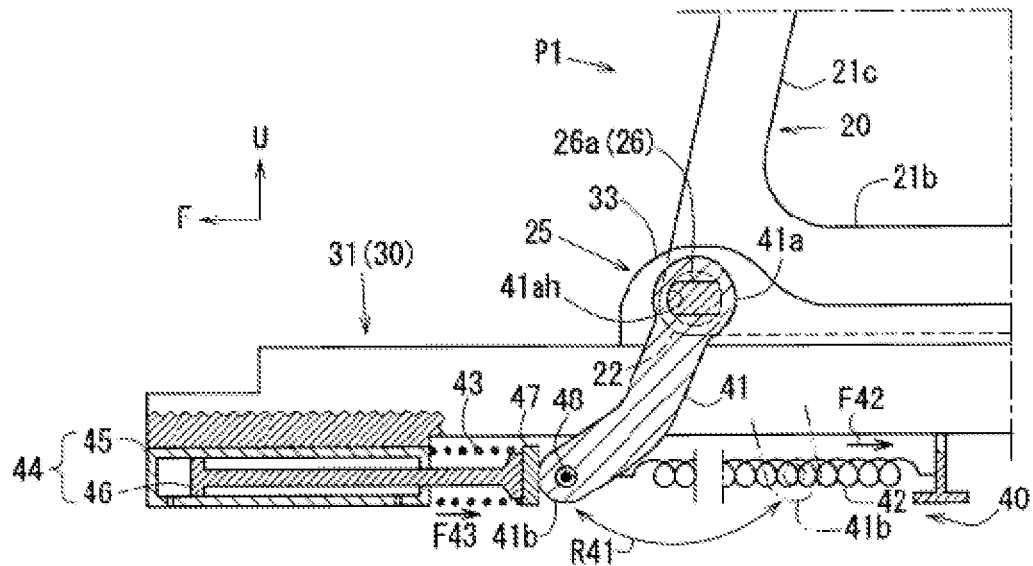

As illustrated in FIG. 6 and FIGS. 10A and 10B, the swinging arm 41 is provided to a lateral side (in this embodiment, the inner side in the vehicle width direction) of the support-portion rotation shaft portion 25 on the upper surface of the pedestal portion 31 and extends to a lower side than the upper surface of the pedestal portion 31.

Meanwhile, as illustrated in FIG. 12, the above-described shaft 26 of the support-portion rotation shaft portion 25 is provided to extend to a side, on which the swinging arm 41 is provided, with respect to the support-portion lower-side pivotally supporting portion 22 and the pedestal-side pivotally supporting portion 33 (in this embodiment, the vehicle-width-direction inner side in the vehicle width direction). Furthermore, as illustrated in FIGS. 10A and 10B and FIG. 12, an extension portion 26*a* of the shaft 26 of the support-portion rotation shaft portion 25 is fitted in a through hole 401*ah* provided to an upper end portion 41*a* of the swinging arm 41 such that the swinging arm 41 is incapable of relative displacement around the axis line (shaft 26) with respect to the extension portion 26*a*.

Accordingly, the upper end portion 41*a* of the swinging arm 41 becomes coaxial with rotation of the support portion 20 with respect to the vehicle body by the shaft 26 of the support-portion rotation shaft portion 25 and is synchronously rotated with the rotation of the support portion 20 with respect to the vehicle body.

Specifically, a lower end 41*b* (swinging end) of the swinging arm 41 swings to be rotated to the vehicle rear side in response to rotation of the support portion 20 to the vehicle front side (that is, the flipped-up position (P2)) around the support-portion rotation shaft portion 25 as a center (see FIG. 10A) and swings to be rotated to the vehicle front side in response to rotation of the support portion 20 to the vehicle rear side (that is, the seat side-portion position (P1)) around the support-portion rotation shaft portion 25 as the center.

As illustrated in FIGS. 10A and 10B, the tension spring 42 is a coil spring that is arranged in the rear of the lower end 41*b* of the swinging arm 41 such that a center axis generally agrees with the vehicle front-rear direction, a front end is locked to the lower end 41b of the swinging arm 41 via a shaft 48 extending in the vehicle width direction, and a rear end is fixed to the pedestal portion 31 side. The tension spring 42 has a natural length when the lower end 41b of the swinging arm 41 that swings in the vehicle front-rear direction is positioned at a rear end of its swinging range R41 (at the timing illustrated in FIG. 10A) and is urged to the vehicle rear by being pulled to the vehicle front in response to rotation of the lower end 41b of the swinging arm 41 from the rear end of the swinging range R41 to the front, as illustrated in FIG. 10B.

The damper 44 includes a cylinder 45 fixed to the pedestal portion 31 and a piston 46 capable of protruding or being retracted with respect to the cylinder 45. The damper 44 is arranged in front of the lower end 41b of the swinging arm 41 such that a center axis generally agrees with the vehicle front-rear direction.

In addition, a configuration is made such that a movable member 47 that integrally slides with the piston 46 is integrally provided to a distal end portion (rear end portion) of the piston 46, as illustrated in FIG. 10A, the piston 46 protrudes with respect to the cylinder 45, the movable member 47 thereby slides to the vehicle rear, as illustrated in FIG. 10B, the piston 46 is retracted into the cylinder 45, and the movable member 47 is thereby slidable to the vehicle front.

That is, when the lower end 41b of the swinging arm 41 is rotated from the rear end of the swinging range R41 to the vehicle front, the lower end 41b presses the movable member 47 to the vehicle front (see FIG. 10B). Accordingly, the piston 46 of the damper 44 slides in a direction of retraction into the cylinder 45, and as a result, a braking force to the vehicle rear is exerted on the damper 44.

The compression spring 43 is a coil spring that is tensioned between a front end of the movable member 47 and an outer periphery side rear end of the cylinder 45 such that a center axis becomes coaxial with a center axis of the piston 46. The compression spring 43 has a natural length when the lower end 41b of the swinging arm 41 is positioned at the rear end of the swinging range R41 and is urged to the vehicle rear by being compressed to the vehicle front in response to rotation of the lower end 41b of the swinging arm 41 from the rear end of the swinging range R41 to the front. Note that the above-described movable member 47 slides in the vehicle front-rear direction together with the lower end 41b of the swinging arm 41 by pressing to the front by the lower end 41b of the swinging arm 41 and a restoring force (urging force) of the compression spring 43 in a compressed state to the rear.

As for the inertial force buffering mechanism 40, in the above-described configuration, when the support portion 20 in the flipped-up position (P2) is about to be rotated to the rear (the side of the seat side-portion position (P1)) around the support-portion rotation shaft portion 25 as the center (that is, when being about to be rotated from a state illustrated in FIG. 10A to a state illustrated in (b)), as described above, the lower end 41b of the swinging arm 41 is displaced from a rear end position of the swinging range R41 to the front, and the inertial force buffering mechanism 40 can thereby exert the urging forces of the tension spring 42 and the compression spring 43 to the vehicle rear and the braking force of the damper 44 to the vehicle rear.

Accordingly, the inertial force buffering mechanism 40 can stably maintain the entry-and-exit assistance device 1 (support portion 20) in the housed state P2 such that the entry-and-exit assistance device 1 is not unintentionally displaced from the housed state P2 (flipped-up position (P2)) to the rear with the support-portion rotation shaft portion 25 being the center due to an influence or the like of rapid acceleration of the vehicle.

In addition, the inertial force buffering mechanism 40 uses the urging forces of the tension spring 42 and the compression spring 43 to the vehicle rear and the braking force of the damper 44 to the vehicle rear when the entry-and-exit assistance device 1 is moved from the housed state P2 to the using state P1 and can thereby make soft an operation feeling felt by the occupant when the entry-and-exit assistance device 1 is moved from the housed state P2 to the using state P1.

For example, because when the entry-and-exit assistance device 1 is moved from the housed state P2 to the using state P1, the support portion 20 is rotated to the rear around the support-portion rotation shaft portion 25 as the center against the urging forces of the tension spring 42 and the compression spring 43 (see bold arrows F42 and F43 in FIG. 10B), an influence of the masses (inertia) of the board 10 and the support portion 20 in such movement of the entry-and-exit assistance device 1 can be buffered.

Meanwhile, in the inertial force buffering mechanism 40, when the entry-and-exit assistance device 1 is moved from the using state P1 to the housed state P2, the urging forces of the tension spring 42 and the compression spring 43 to the vehicle rear (see the bold arrows F42 and F43 in FIG. 10B) are used, and the support portion 20 can thereby be rotated to the vehicle front side around the support-portion rotation shaft portion 25 as the center by lifting a rear part of the support portion 20.

Thus, in this case also, similarly to a case where the entry-and-exit assistance device 1 is moved from the housed state P2 to the using state P1 as described above, the operation feeling felt by the occupant can be made soft. That is, by the respective restoring forces (urging forces) of the tension spring 42 and the compression spring 43, a motion can be assisted in which the support portion 20 is rotated from the seat side-portion position (P1) to the flipped-up position (P2) and set to the forward-inclined posture (lifting of a rear portion of the support portion 20).

Next, a description will be made about functions of the above-described linking mechanism 50 in a case where the entry-and-exit assistance device 1 of this embodiment is moved from the using state P1 to the housed state P2 by using FIG. 7, FIG. 8, FIG. 11, and FIG. 12. As illustrated in FIG. 7, when the entry-and-exit assistance device 1 is set from the using state P1 to the housed state P2, the support portion 20 is rotated to the front around the support-portion rotation shaft portion 25 as the center, that is, from the seat side-portion position (P1) to the flipped-up position (P2).

Linking with this rotation of the support portion 20, the link member 51 is rotated to the front around the second joining portion 53A as a center (see FIG. 7 and FIG. 11).

Here, as described above, the second joining portion 53A (a rotation center of the link member 51 with respect to the vehicle) and the support-portion rotation shaft portion 25 (a rotation center of the support portion 20 with respect to the vehicle) are set to geometry in which those are respectively shifted to the vehicle front side and vehicle rear side such that the second joining portion 53A is positioned in the vehicle front of the support-portion rotation shaft portion 25 (see FIG. 11).

Thus, the link member 51 is rotated toward the vehicle front while linking with rotation of the support portion 20 as the support portion 20 is tilted forward and gradually pushes the board 10 upward and inward in the vehicle width direction in response to the rotation (see FIG. 7 and FIG. 8).

Specifically, as illustrated in FIG. 7 and FIG. 11, the link member 51 gradually stands from a rearward-inclined posture in the vehicle side view as the support portion 20 is tilted forward and is thus interposed to be stretched between the board 10 and the vehicle body. As illustrated in FIG. 8 and FIG. 12, by such a link member 51, the board 10 is pushed up to be rotated to the vehicle-width-direction inner side with respect to the support portion 20 around the board rotation shaft portion 15 as the center.

In addition, as described above, the first shaft portion 51c of the link member 51 in the first joining portion 52A is joined to the board 10 via the first universal joint 52, and the second shaft portion 51e of the link member 51 in the second joining portion 53A is joined to the upper surface of the pedestal portion 31 via the second universal joint 53 (see FIG. 11 and FIG. 12). Thus, the link member 51 becomes capable of being rotated (swung) also in the vehicle width direction as the support portion 20 is tilted forward.

That is, in the link member 51, the upper part of the linear portion 51a is not only displaced from the vehicle rear side to the vehicle front side but also displaced from the inner side to the outer side in the vehicle width direction, and as described above, the link member 51 can thereby push up the board 10 such that the board 10 is rotated to the vehicle-width-direction inner side with respect to the support portion 20 about the board rotation shaft portion 15 as a pivot (see FIG. 11 and FIG. 12).

In other words, as described above, the second joining portion 53A (the rotation center of the link member 51 with respect to the vehicle body) and the support-portion rotation shaft portion 25 (the rotation center of the support portion 20 with respect to the vehicle body) are set to geometry in which those are respectively shifted to the vehicle front side and vehicle rear side. Thus, when the entry-and-exit assistance device 1 is moved from the using state P1 to the housed state P2, a difference between rotation loci in a case where the link member 51 and the support portion 20 based on such geometry respectively rotate with respect to the vehicle body can be absorbed by upward pushing of the board 10 by the link member 51 and gradual inclination (displacement) of an upper portion of the linear portion 51a of the link member 51 from the vehicle-width-direction inner side to the outer side.

Consequently, during movement of the entry-and-exit assistance device 1 from the using state P1 to the housed state P2, the link member 51 is linked with the support portion 20 and the board 10 without being excessively stretched, those are smoothly rotated, and as a result, the board 10 is pushed up to be rotated to the vehicle-width-direction inner side with respect to the support portion 20.

Note that when the entry-and-exit assistance device 1 is moved from the housed state P2 to the using state P1 (in the reverse direction to the above description), the reverse motions to the above-described motions in the movement from the using state P1 to the housed state P2 are respectively performed for the support portion 20, the board 10, and the link member 51, and a description about those will thus not be made.

Here, as a modification of this embodiment, the support portion (20) may be configured to be rotatable between the seat side-portion position (P1) positioned on the vehicle-width-direction outer side of the seat cushion (104a) of the driver seat (104) and the flipped-up position (not illustrated) in which the support portion 20 is flipped up to the vehicle rear side of the seat side-portion position (P1) (that is, on a rear side of the seat in a side view), and in this case, the board (10) may be configured to take an orthogonal posture similar to the above-described orthogonal posture in the flipped-up position of the support portion (20). In the case of this modification, the entry-and-exit assistance device 1 for a vehicle that includes the linking mechanism 50 may have a configuration opposite to this embodiment described above in the vehicle front-rear direction (for example, a configuration that forms plane symmetry in the vehicle front-rear direction in FIG. 7).

Figure 15A:
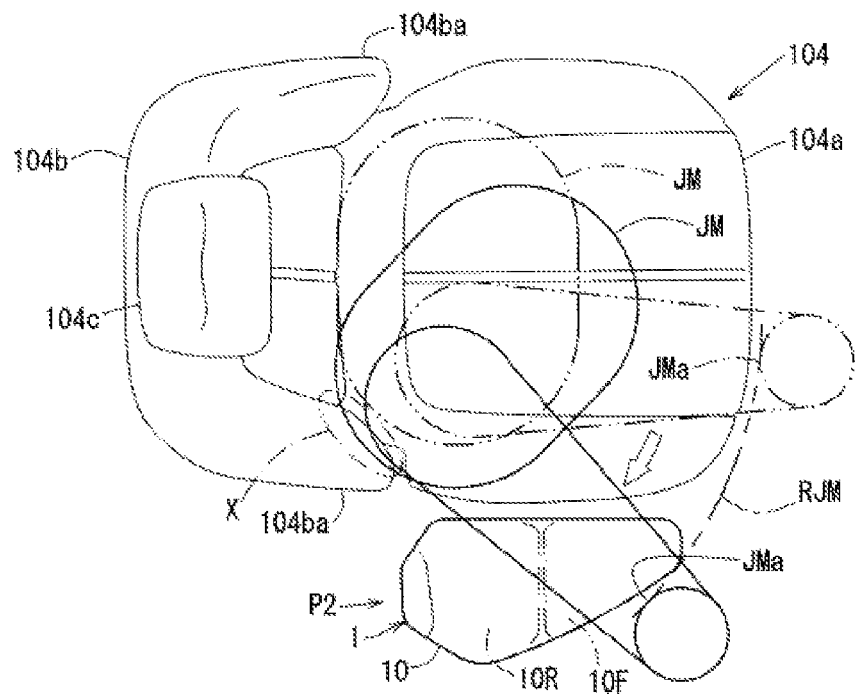
FIGS. 15A-15B show plan views of portions around a driver seat for explaining leg extracting motions in a case where an occupant is large (FIG. 15A) and a case where an occupant is small (FIG. 15B).

Next, a description will be made of one example of a procedure in which when the occupant with disabled lower limbs enters or exits the vehicle, the occupant is transferred between the driver seat 104 and the wheelchair (not illustrated) by using the entry-and-exit assistance device 1. In particular, a description will be made, by mainly using FIG. 15A, of one example of a procedure in which when the occupant enters or exits the vehicle and is transferred from the driver seat 104 to the wheelchair from the state where the entry-and-exit assistance device 1 is in the housed state P2 and the side door 112 is closed. However, an occupant JM illustrated in FIG. 15A is assumed to be a person with a large body among Japanese people, and only the torso (buttocks) and right leg of the occupant JM are illustrated.

The occupant seated on the driver seat 104 opens the side door 112, changes the wheelchair that is housed in the vehicle cabin, by folding or the like, in a place that can be reached by his/her hand to a ridable form, and sets the wheelchair to a state where that is brought alongside the outside of the vehicle cabin on the vehicle-width-direction outer side with respect to the driver seat 104 through the door opening 110.

Here, when the side door 112 is closed, as described above, the entry-and-exit assistance device 1 is restrained from being displaced rearward by the protrusion portions 114 such as the assist grip 114a provided to the side door 112 in the housed state P2 (see FIG. 9), but as described above, the entry-and-exit assistance device 1 is released from restraint by the protrusion portions 114 by opening the side door 112.

Thus, the occupant grips the grip portion 24 provided to the support portion 20 of the entry-and-exit assistance device 1 in the housed state P2 in a state where he/she is seated on the driver seat 104, rotates the support portion 20 to tilt that rearward, and can thereby set the entry-and-exit assistance device 1 to the using state P1. Specifically, in the entry-and-exit assistance device 1, the support portion 20 can be arranged in a position between the driver seat 104 and the wheelchair, that is, the seat side-portion position (P1), and the board 10 can be set to the horizontal posture (P1) (see FIG. 1, FIG. 3, and FIG. 4).

Then, the occupant JM slightly slides his/her buttocks to a position of a seat surface of the seat cushion 104a on the outer side in the vehicle width direction (a side on which the board 10 is provided) while placing his/her body (upper body) on the seat back 104b of the driver seat 104 from a state indicated by bold imaginary lines in FIG. 15A, specifically, moving his/her upper body along the seat back 104b. Subsequently, the occupant JM places his/her body on a side support 104ba provided to a right side (vehicle-width-direction outer side) in side supports 104ba provided to both sides of the seat back 104b (see a region X in FIG. 15A).

Then, as indicated by solid lines in FIG. 15A, the occupant JM performs a motion to rotate his/her leg (thigh) to the outside of the vehicle cabin while rotating his/her leg (thigh) directed to generally the vehicle front clockwise in the vehicle plan view around his/her buttocks as a pivot in a state where his/her body is placed on the side support 104ba (see the blank arrow in FIG. 15A).

After the above-described series of leg extracting motions, the occupant JM moves his/her upper body to the board 10 side while slightly lifting his/her buttocks from the driver seat 104 in a state where his/her hand is put on the narrow-width region 10F as the hand-putting region in the board 10 and temporarily places his/her buttocks on the wide-width region 10R, for example, of the board 10 (not illustrated).

Further, the occupant JM moves his/her buttocks from the wide-width region 10R of the board 10 to the seat of the wheelchair in a state where his/her hand is put (placed) on the hand-putting region in the board 10 and can thereby be seated on the seat of the wheelchair.

Here, a track RJM indicated by a one-dot chain line in FIG. 15A indicates a track of a back of knee JMa in a plan view during the leg extracting motions of the occupant JM. As it is clear from this track RJM, because a front-side section of the board 10 is formed as the narrow-width region 10F in this embodiment, even when the occupant JM performs the above-described leg extracting motions in a state where the occupant JM places (makes abut) his/her body on the seat back 104b, the occupant JM can smoothly be transferred without the back of knee JMa of the occupant JM interfering with the board 10 (particularly, the front edge 10c or the vehicle-width-direction outer edge 10b of the board 10 (see FIG. 4)).

Figure 15B:
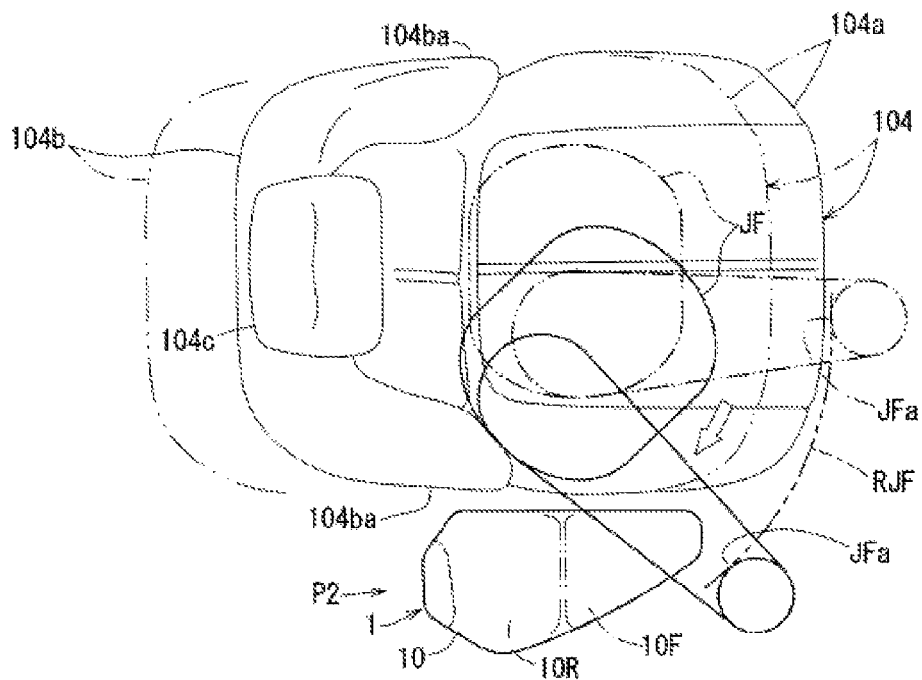

FIG. 15B illustrates a situation in which a small occupant JF among Japanese people performs the above-described leg extracting motions, corresponding to FIG. 15A. As illustrated in FIG. 15B, in a case of the small occupant JF, compared to the large occupant JM, the position of the driver seat 104 (driving position) is set to a front position. Note that the position of the driver seat 104 that is partially indicated by imaginary lines in FIG. 15B indicates the position of the driver seat 104 in FIG. 15A.

As illustrated in FIG. 15B, in a case of the small occupant JF, although the driving position is set to front compared to the above-described case of the large occupant JM, as indicated in FIG. 15B by a track RJF of a back of knee JFa in a plan view in a case where the small occupant JF performs the leg extracting motions, also in this case of the small occupant JF, the occupant JF can smoothly be transferred in the leg extracting motions without the back of knee JFa interfering with the board 10.

That is, regardless of differences in the body shape of the occupant and the driving position of the driver seat 104, the occupant can smoothly be transferred in the leg extracting motions without the back of knee interfering with the board 10. Note that after the entry-and-exit assistance device 1 is moved from the using state P1 to the housed state P2, the occupant can close the side door 112.

Further, although not illustrated, a description will be made of one example of a procedure in which the occupant is transferred from the wheelchair to the driver seat 104 from the state where the entry-and-exit assistance device 1 is in the housed state P2 and the side door 112 is closed when the occupant enters the vehicle.

The occupant opens the side door 112 and moves the entry-and-exit assistance device 1 from the housed state P2 to the using state P1 as described above in a state where the occupant is riding on the wheelchair brought alongside the vehicle-width-direction outer side with respect to the driver seat 104 through the door opening 110.

As for such work, for example, the occupant extends his/her hand from the outside of the vehicle to the entry-and-exit assistance device 1 through the door opening 110 in a state where the occupant is seated on the wheelchair and rotates the support portion 20 to tilt that rearward by appropriately, for example, gripping a predetermined part of the frame-shaped member 21 of the support portion 20, and the work can thereby be performed.

Then, the occupant moves his/her upper body from the seat of the wheelchair to the board 10 side in a state where his/her hand is put on the narrow-width region 10F while supporting his/her body by the arm of the put hand and temporarily places his/her buttocks on the wide-width region 10R, for example, of the board 10. Accordingly, the occupant can temporarily place his/her buttocks on the buttock temporary placement region SR (see FIG. 4) in the wide-width region 10R of the board 10 in a posture in which his/her leg (thigh) is directed to the vehicle front and the vehicle-width-direction outer side.

From this state, the occupant moves his/her upper body to a seat surface side of the driver seat 104 while slightly lifting his/her buttocks from the board 10 in a state where his/her hand is put on the narrow-width region 10F as a hand placement region in the board 10.

Further, from this state, the occupant inserts his/her leg to a space in front of the driver seat 104 while rotating his/her leg (thigh) counterclockwise in the vehicle plan view around his/her buttocks, as a pivot, which are positioned on the seat surface of the driver seat 104 and can thereby be seated on the driver seat 104.

As illustrated in FIG. 1 to FIG. 4, the above-described entry-and-exit assistance device 1 of this embodiment is an entry-and-exit assistance device for a vehicle that includes the board 10 capable of being moved between the horizontal posture (P1) (using state P1) in which the board 10 becomes generally horizontal (see FIG. 1) and the orthogonal posture (P2) (housed state P2) in which the board 10 is generally orthogonal to the vehicle width direction in the vehicle cabin (see FIG. 2) on the vehicle-width-direction outer side of the seat cushion 104a (seat) of the driver seat 104 adjacent to the door opening 110 of the vehicle. As illustrated in FIG. 1 to FIG. 7, the support portion 20 provided between the board 10 and the base 30 (vehicle body) is pivotally supported by the base 30 to be rotatable around the axis line (26) extending in the vehicle width direction between the seat side-portion position (P1) in which the support portion 20 is positioned on the vehicle-width-direction outer side of the seat cushion 104a of the driver seat 104 (see FIG. 1) and the flipped-up position (P2) in which the support portion 20 is flipped up to the front of the seat side-portion position (P1) (see FIG. 3). The board 10 is supported to be rotatable, with respect to the support portion 20, around the axis line (shaft 16) orthogonal to the vehicle width direction such that the board 10 takes the horizontal posture (P1) when the support portion 20 is positioned in the seat side-portion position (P1) (see FIG. 1) and takes the orthogonal posture (P2) when the support portion 20 is positioned in the flipped-up position (P2) (see FIG. 2) (see FIG. 6 and FIG. 7). In addition, as illustrated in FIG. 2, FIG. 5 to FIG. 8, and FIG. 11 to FIG. 14C2, between the board 10 and the base 30, the linking mechanism 50 is provided such that the board 10 is rotated to the vehicle-width-direction inner side with respect to the support portion 20 and takes the orthogonal posture (P2) while linking with rotation of the support portion 20 from the seat side-portion position (P1) to the flipped-up position (P2) and the board 10 is rotated to the vehicle-width-direction outer side with respect to the support portion 20 while linking with rotation of the support portion 20 from the flipped-up position (P2) to the seat side-portion position (P1). That is, the entry-and-exit assistance device 1 for a vehicle in this embodiment includes the board 10 that is provided to the vehicle-width-direction outer side of the seat 104 adjacent to the door opening 110 of the vehicle V and is rotatable between the horizontal posture (P1) in which the board 10 becomes generally horizontal and the orthogonal posture (P2) in which the board 10 is generally orthogonal to the vehicle width direction in the vehicle cabin, the support portion 20 that is the support portion 20 of the board 10 provided between the board 10 and the vehicle body (side sill 102) and is rotatable between the seat side-portion position (P1) on the vehicle-width-direction outer side of the seat 104 and the flipped-up position (P2) in which the support portion 20 is flipped up to the vehicle front side or the vehicle rear side of the seat side-portion position (P1), and the linking mechanism 50 that is provided between the board 10 and the vehicle body (102) and links rotation of the board 10 with rotation of the support portion 20, the board 10 is pivotally supported by the support portion 20 to be rotatable around the axis line (16) orthogonal to the vehicle width direction and is supported by mainly the support projection 29 of the support portion 20 in the horizontal posture (P1), the support portion 20 is pivotally supported by the vehicle body (102) to be rotatable around the axis line (shaft 26) extending in the vehicle width direction, and the linking mechanism 50 is configured to cause the board 10 to be rotated to the vehicle-width-direction inner side with respect to the support portion 20 and take the orthogonal posture (P2) when the support portion 20 is rotated from the seat side-portion position (P1) to the flipped-up position (P2) and to cause the board 10 to be rotated to the vehicle-width-direction outer side with respect to the support portion 20 and take the horizontal posture when the support portion 20 is rotated from the flipped-up position (P2) to the seat side-portion position (P1).

In such a configuration of this embodiment, the board 10 can be rotated to the vehicle-width-direction inner side with respect to the support portion 20 and take the orthogonal posture (P2) while linking with rotation of the support portion 20 from the seat side-portion position (P1) to the flipped-up position (P2), and the board 10 can be rotated to the vehicle-width-direction outer side with respect to the support portion 20 and take the horizontal posture (P1) while linking with rotation of the support portion 20 from the flipped-up position (P2) to the seat side-portion position (P1) (see FIG. 2 to FIG. 4, FIG. 7, and FIG. 8).

Consequently, the displacement of the entry-and-exit assistance device 1 between the using state P1 (the state where the support portion 20 is positioned in the seat side-portion position (P1) and the board 10 takes the horizontal posture (P1)) and the housed state P2 (the state where the support portion 20 is in the flipped-up position and the board 10 takes the orthogonal posture (P2)) can be performed by one action (one motion).

Further, in this embodiment, when the entry-and-exit assistance device 1 is set to the using state P1, the board 10 can be arranged to take the horizontal posture (P1) to stick out to the vehicle-width-direction outer side of the door opening 110 (see FIG. 1 and FIG. 4). Thus, when the occupant enters or exits the vehicle body, the board 10 is easily used as a temporary placement stand on which his/her body is temporarily placed between the wheelchair and the driver seat 104.

Meanwhile, because the board 10 can be rotated to the vehicle-width-direction inner side with respect to the support portion 20 when the entry-and-exit assistance device 1 is set to the housed state P2, the entry-and-exit assistance device 1 can be housed without interference when the side door 112 is closed (see FIG. 9).

Further, in this embodiment, the linking mechanism 50 includes the link member 51 that couples the board 10 with the base 30, and in the link member 51, the first shaft portion 51c at one end in its longitudinal direction is coupled with a predetermined part of the lower surface 10e of the board 10, which is directed downward when the board 10 is in the horizontal state (P1), via the first universal joint 52 (see FIG. 5 and FIG. 11). Further, in the link member 51, the second shaft portion 51e at the other end in its longitudinal direction is coupled with a part of the base 30 on the front side, in the vehicle front-rear direction, of the support-portion rotation shaft portion 25 (pivotally supporting portion) of the support portion 20, which is pivotally supported with respect to the base 30 (vehicle body), (a part on the side on which the flipped-up position (P2) is positioned) via the second universal joint 53 (see FIG. 5, FIG. 7, and FIG. 11). Furthermore, the linking mechanism 50 is configured such that when the support portion 20 is rotated to the front (the side of the flipped-up position (P2)), the first joining portion 52A (a connecting portion on one end side (51c) of the link member 51 to the board 10 side) is positioned on the front side (the opposite side to the side of the seat side-portion position (P1) in the vehicle front-rear direction) with respect to the position X16 of the shaft 16 (a rotation shaft around which the board 10 is rotated with respect to the support portion 20) of the board rotation shaft portion 15 (see FIG. 7 and FIG. 11). That is, the linking mechanism 50 includes the link member 51 that couples the board 10 with the vehicle body (102), in the link member 51, one end in its longitudinal direction is coupled with a predetermined part 52A of the lower surface 10e in a case where the board 10 is in the horizontal posture via the first universal joint 52, and the other end in its longitudinal direction is coupled with a predetermined part of the vehicle body (102) via the second universal joint 53, the predetermined part of the vehicle body is a part 53A spaced apart from pivotally supporting parts 25 and 26 of the support portion 20 to the vehicle body (102) to the vehicle front side or the vehicle rear side as the side to which the support portion 20 is flipped up, and the linking mechanism 50 is configured such that when the support portion 20 is rotated to the flipped-up position, the predetermined part 52A of the board with which one end of the link member 51 in the longitudinal direction is coupled comes to a position spaced apart from the axis line 16, X16 of pivotally supporting parts 15 and 17 of the board 10 to the support portion 20 to the vehicle front side or the vehicle rear side as the side to which the support portion 20 is flipped up.

In such a configuration of this embodiment, as described above, by simple configurations such as the link member 51 and the universal joints 52 and 53, the displacement of the entry-and-exit assistance device 1 between the using state P1 and the housed state P2 can be performed by one action.

Further, in this embodiment, as illustrated in FIG. 9, a configuration is made such that in a rear vicinity position with respect to the board 10 in the orthogonal posture (2) (a vicinity position on the horizontal posture (P1) side in the vehicle front-rear direction), the protrusion portions 114, for example, such as the assist grip 114a that is provided to protrude from the door trim 113 (an inner wall in the vehicle width direction) of the side door 112 (door) opening and closing the door opening 110 to the vehicle-width-direction inner side are arranged when the door opening 110 is closed by the side door 112. That is, the linking mechanism 50 is configured such that when the support portion 20 is in the flipped-up position, the board 10 in the orthogonal posture (P2) is positioned on the vehicle front side or the vehicle rear side as the side to which the support portion 20 is flipped up and in the vicinity with respect to the assist grip 114, 114a of the inner wall of the door 112 in a case where the door 112 of the door opening 110 is closed.

In such a configuration, when the side door 112 is closed and the support portion 20 positioned in the flipped-up position (P2) is rotated to the seat side-portion position (P1), the board 10 in the orthogonal posture (P2) abuts the protrusion portions 114 such as the assist grip 114a, and the support portion 20 can thereby be restrained from being unintentionally rotated to the seat side-portion position (P1).

Further, in this embodiment, as illustrated in FIG. 5, FIG. 6, and FIGS. 10A and 10B, between the support portion 20 and the base 30 (vehicle body), the inertial force buffering mechanism 40, specifically, the tension spring 42 and the compression spring 43 as urging means for urging the support portion 20 from the seat side-portion position (P1) to the flipped-up position (P2) and the damper 44 as braking means for braking a speed of displacement from the flipped-up position (P2) to the seat side-portion position (P1) are provided.

In such a configuration, an influence of the masses (inertia) of the support portion 20 and the board 10 in an operation for rotating the support portion 20 between the seat side-portion position (P1) and the flipped-up position (P2) can be buffered, and as a result, operability in the above-described operation can be enhanced (an operation feeling can be made soft).

Further, the support portion 20 can be held in the flipped-up position (P2) such that the support portion 20 positioned in the flipped-up position (P2) is not unintentionally tilted to the seat side-portion position (P1) side due to rapid acceleration or deceleration of the vehicle.

The present disclosure is not limited only to the configurations of the above-described embodiment but can be configured as various embodiments.

For example, according to the present disclosure, the driver seat 104 is employed as a vehicle seat; however, as long as the vehicle seat is a seat adjacent to the door opening 110, the vehicle seat is not limited to the driver seat 104, but another vehicle seat such as a passenger seat may be employed.

Further, as the first universal joint 52 and the second universal joint 53, ball joints are employed in this embodiment; however, a universal joint is not limited to those, but various kinds of known universal joints referred to as Cardan joint, Rzeppa joint, and so forth may be employed.

Further, the above-described embodiment is an embodiment in which the support portion 20 is rotatable between the flipped-up position (P2) and the flipped-up position (P2) in which the support portion 20 is flipped up to the front of the flipped-up position (P2); however, the present disclosure is not limited to this, but a configuration may be employed in which the support portion 20 is rotatable between the flipped-up position (P2) and the flipped-up position (P2) set to the rear of the flipped-up position (P2).

Figure 17B:
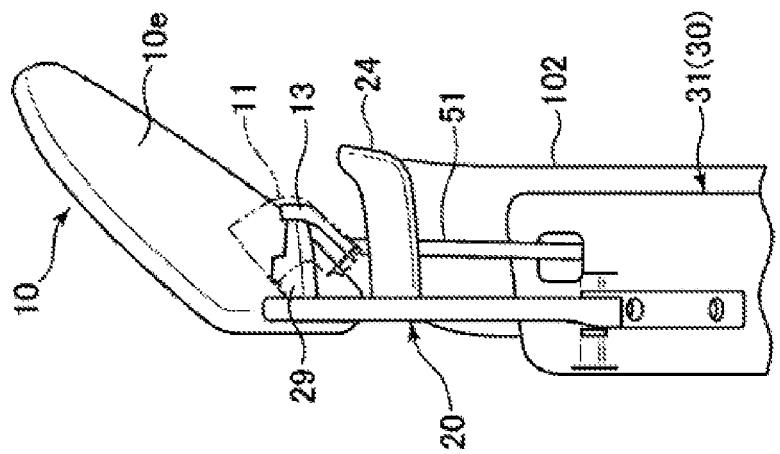
FIGS. 17A-17B show a side view (FIG. 17A) and a rear perspective view (FIG. 17B) that illustrate the support projection of the support portion and the cover member of the board in the state during the movement of the entry-and-exit assistance device of this embodiment.
Figure 17A:
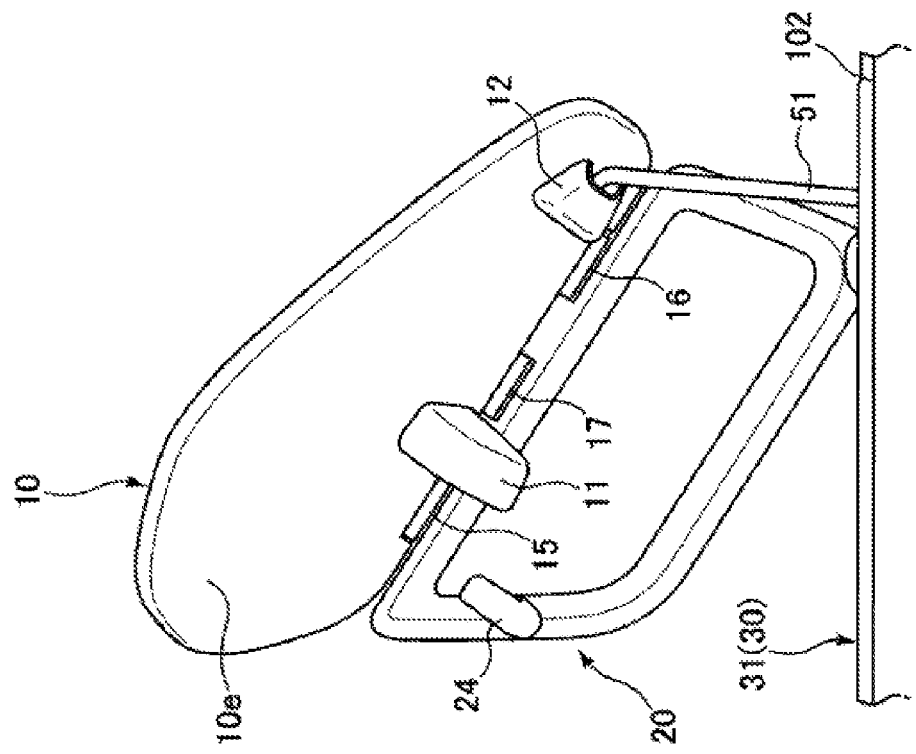
Figure 18B:
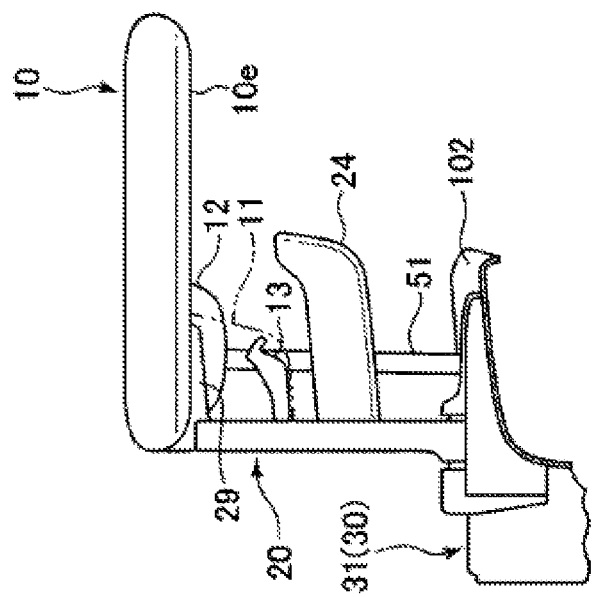
FIGS. 18A-18B show a side view (FIG. 18A) and a rear view (FIG. 18B) that illustrate the support projection of the support portion and the cover member of the board in the using state of the entry-and-exit assistance device of this embodiment.
Figure 18A:
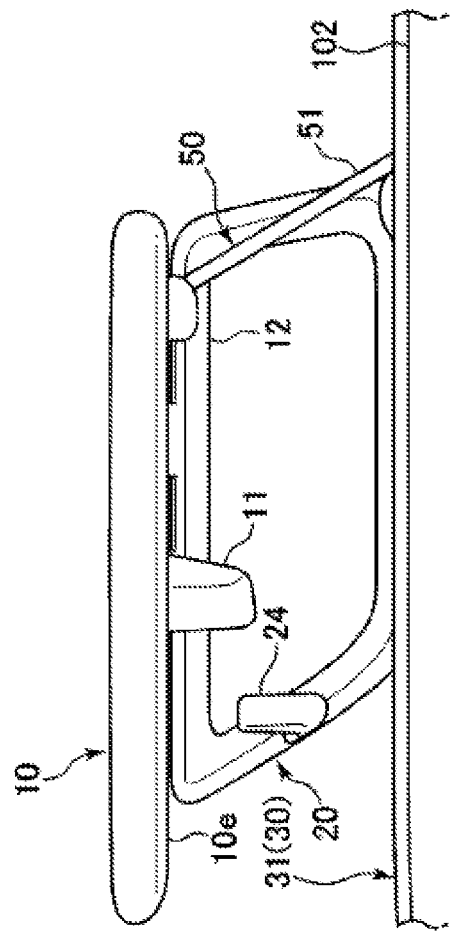

Next, by using FIG. 16A to FIG. 18B, a description will be made about configurations of the support projection 29 of the support portion 20 of the entry-and-exit assistance device of this embodiment and the cover member 11 formed on the board 10. FIG. 16A shows a side view and FIG. 16B shows a rear perspective view for explaining the support projection of the support portion and the cover member of the board in the housed state of the entry-and-exit assistance device of this embodiment, FIG. 17A shows a side view and FIG. 17B shows a rear perspective view for explaining the support projection of the support portion and the cover member of the board in the state during the movement of the entry-and-exit assistance device of this embodiment, and FIG. 18A shows a side view and FIG. 18B shows a rear view for explaining the support projection of the support portion and the cover member of the board in the using state of the entry-and-exit assistance device of this embodiment. In FIG. 17B and FIG. 18B, the cover member 11 is indicated by imaginary lines, and an anti-vibration rubber member 13 mounted on an internal portion of the cover member 11 is indicated by solid lines.

First, as described above, the support projection 29 that generally horizontally protrudes to the vehicle-width-direction outer side is provided in the vicinity of and a position on the rear side of the intermediate position of the upper side portion 21a, in the vehicle front-rear direction, of the support portion 20, the upper surface of the support projection 29 abuts the lower surface 10e of the board 10 in the horizontal posture (P1), and the support projection 29 thereby supports the board 10 from a lower side (see FIG. 5 and FIG. 7).

Here, as illustrated in FIG. 16A to FIG. 18B, on the lower surface 10e of the board 10 that the support projection 29 abuts, the cover member 11 is formed that covers at least a part of the support projection 29. More specifically, in the housed state illustrated in FIGS. 16A-B, the cover member 11 covers at least an upper surface (a surface abutting the lower surface 10e of the board 10) of the support projection 29. In the state during the movement that is illustrated in FIGS. 17A-B, the cover member 11 is rotated such that the support projection 29 is housed in an inner space of the cover member 11. In the using state illustrated in FIGS. 18A-B, the support projection 29 is housed in the inner space of the cover member 11.

As illustrated in FIG. 17B and FIG. 18B, on an inside surface (a surface forming the inner space) of the cover member 11 indicated by the imaginary lines, the anti-vibration rubber 13 is mounted. Particularly in the housed state, the anti-vibration rubber 13 prevents abnormal sounds or rattling due to contact between the cover member 11 and the support projection 29 that is caused by traveling vibration or the like. The anti-vibration rubber 13 of this embodiment contacts with the support projection 29 in the housed state and the state during the movement and thereby prevents an occurrence of abnormal sounds.

As described above, in this embodiment, the support portion 20 is provided with the protruding portion 29 that supports the board 10 from below when the board 10 is in the horizontal posture (P1), the cover member 11 that covers at least a part of the protruding portion 29 of the support portion 20 when the board 10 is in the orthogonal posture (P2) is provided on the lower surface 10e of the board 10, and the cover member 11 is formed such that the protruding portion 29 is housed in the inner space of the cover member 11 when the support portion 20 is rotated from the flipped-up position (P2) to the seat side-portion position (P1).

In this embodiment in such a configuration, the occupant can be prevented from rotating the support portion 20 by mistakenly gripping and operating not the grip portion 24 or a frame of the support portion 20 that is supposed to be operated but the support projection 29 provided for supporting the board 10, and a finger of the occupant can thereby be prevented from being caught between the support portion 20 and the board 10 due to linkage between rotation of the support portion 20 and rotation of the board 10. Further, even in a case where the support projection 29 is not mistakenly gripped and operated, a finger of the occupant can be prevented from being caught due to linkage between rotation of the support portion 20 and rotation of the board 10.

The present disclosure is not limited only to the configurations of the above-described embodiment but can be configured as various embodiments.

What is claimed is:

1. An entry-and-exit assistance device for a vehicle, the entry-and-exit assistance device being provided on a vehicle-width-direction outer side of a seat adjacent to a door opening of the vehicle, the entry-and-exit assistance device comprising:
   a board that is rotatable between a horizontal posture in which the board is substantially horizontal and an orthogonal posture in which the board is substantially orthogonal to a vehicle width direction in a vehicle cabin;
   a support portion that is a support portion of the board provided between the board and a vehicle body and is rotatable between a seat side-portion position on a vehicle-width-direction outer side of the seat and a flipped-up position in which the support portion is flipped up to a vehicle front side or a vehicle rear side of the seat side-portion position; and
   a linking mechanism that is provided between the board and the vehicle body and links rotation of the support portion with rotation of the board, wherein
   the board is pivotally supported by the support portion to be rotatable around an axis line orthogonal to the vehicle width direction and is supported by the support portion to maintain the horizontal posture when the board is in the horizontal posture,
   the support portion is pivotally supported by the vehicle body to be rotatable around an axis line extending in the vehicle width direction, and
   the linking mechanism is configured to cause the board to be rotated to a vehicle-width-direction inner side with respect to the support portion and take the orthogonal posture when the support portion is rotated from the seat side-portion position to the flipped-up position, and to cause the board to be rotated to a vehicle-width-direction outer side with respect to the support portion and take the horizontal posture when the support portion is rotated from the flipped-up position to the seat side-portion position.

2. The entry-and-exit assistance device for a vehicle according to claim 1, wherein
   the linking mechanism includes a link member that couples the board with the vehicle body,
   in the link member, one end in a longitudinal direction is coupled with a predetermined part of a lower surface of the board in the horizontal posture via a first universal joint, and another end in the longitudinal direction is coupled with a predetermined part of the vehicle body via a second universal joint,
   the predetermined part of the vehicle body is a part spaced apart from a pivotally supporting part of the support portion to the vehicle body to a vehicle front side or a vehicle rear side as a side to which the support portion is flipped up, and
   the linking mechanism is configured such that when the support portion is rotated to the flipped-up position, the predetermined part of the board with which the one end of the link member in the longitudinal direction is coupled is disposed at a position spaced apart from an axis line of a pivotally supporting part of the board to the support portion to a vehicle front side or a vehicle rear side as a side to which the support portion is flipped up.

3. The entry-and-exit assistance device for a vehicle according to claim 2, wherein
   the linking mechanism is configured such that when the support portion is in the flipped-up position, the board in the orthogonal posture is positioned on a vehicle front side or a vehicle rear side as a side to which the support portion is flipped up and in a vicinity with respect to an assist grip of a door inner wall in a case where a door of the door opening is closed.

4. The entry-and-exit assistance device for a vehicle according to claim 3, further comprising:
   urging means located between the support portion and the vehicle body for urging the support portion from the seat side-portion position to the flipped-up position; and
   a damper that brakes a speed of displacement from the flipped-up position to the seat side-portion position.

5. The entry-and-exit assistance device for a vehicle according to claim 4, wherein
   the support portion is provided with a protruding portion that supports the board from below when the board is in the horizontal posture,
   on a lower surface of the board, a cover member is provided that covers at least a part of the protruding portion of the support portion when the board is in the orthogonal posture, and the cover member is formed such that the protruding portion is housed in an inner space of the cover member when the support portion is rotated from the flipped-up position to the seat side-portion position.

6. The entry-and-exit assistance device for a vehicle according to claim 1, wherein
   the linking mechanism is configured such that when the support portion is in the flipped-up position, the board in the orthogonal posture is positioned on a vehicle front side or a vehicle rear side as a side to which the support portion is flipped up and in a vicinity with respect to an assist grip of a door inner wall in a case where a door of the door opening is closed.

7. The entry-and-exit assistance device for a vehicle according to claim 1, further comprising:
   urging means located between the support portion and the vehicle body for urging the support portion from the seat side-portion position to the flipped-up position; and
   a damper that brakes a speed of displacement from the flipped-up position to the seat side-portion position.

8. The entry-and-exit assistance device for a vehicle according to claim 1, wherein
   the support portion is provided with a protruding portion that supports the board from below when the board is in the horizontal posture,
   on a lower surface of the board, a cover member is provided that covers at least a part of the protruding portion of the support portion when the board is in the orthogonal posture, and the cover member is formed such that the protruding portion is housed in an inner space of the cover member when the support portion is rotated from the flipped-up position to the seat side-portion position.

* * * * *